United States Patent
Early et al.

(10) Patent No.: US 6,813,908 B2
(45) Date of Patent: Nov. 9, 2004

(54) TREATING AN OPTICAL FIBER PREFORM WITH CARBON MONOXIDE

(75) Inventors: Kintu O. Early, Painted Post, NY (US); Claude E. Lacy, Painted Post, NY (US); Susan L. Schiefelbein, Corning, NY (US); Sabyasachi Sen, Painted Post, NY (US); Wanda J. Walczak, Big Flats, NY (US); Joseph M. Whalen, Corning, NY (US); Tiffany L. James, Wilmington, NC (US); Hazel B. Matthews, Wilmington, NC (US); Chukwuemeka B. Onuh, Wilmington, NC (US)

(73) Assignee: Corning Incorporated, Corning, NY (US)

(*) Notice: Subject to any disclaimer, the term of this patent is extended or adjusted under 35 U.S.C. 154(b) by 73 days.

(21) Appl. No.: 10/021,366

(22) Filed: Dec. 12, 2001

(65) Prior Publication Data

US 2002/0197035 A1 Dec. 26, 2002

Related U.S. Application Data

(60) Provisional application No. 60/295,052, filed on May 31, 2001, and provisional application No. 60/258,061, filed on Dec. 22, 2000.

(51) Int. Cl.$^7$ .......................................... C03B 37/027
(52) U.S. Cl. ........................ 65/399; 65/426; 65/424
(58) Field of Search ..................... 65/378, 399, 426, 65/424

(56) References Cited

U.S. PATENT DOCUMENTS

| 4,620,861 A | 11/1986 | Berkey ...................... 65/3.12 |
| 4,629,485 A | 12/1986 | Berkey ...................... 65/3.11 |
| 4,775,401 A * | 10/1988 | Fleming et al. ............... 65/395 |
| 4,822,136 A * | 4/1989 | Hicks, Jr. .................... 385/142 |
| 4,979,971 A | 12/1990 | Kyoto et al. ................. 65/3.12 |
| 5,157,747 A * | 10/1992 | Aktins et al. ................. 385/37 |
| 5,221,309 A * | 6/1993 | Kyoto et al. ................. 65/416 |
| 5,735,921 A * | 4/1998 | Araujo et al. ............... 65/32.1 |
| 6,376,401 B1 | 4/2002 | Kondo et al. ................. 501/54 |

FOREIGN PATENT DOCUMENTS

| DE | 19942443 | 3/2000 | ............ C03C/4/10 |
| WO | WO 98/18733 | 5/1998 | .......... C03B/29/02 |

OTHER PUBLICATIONS

"Optical Absorption of the Transition Elements in Vitreous Silica", Peter C. Schultz, Journal of the American Ceramic Society, vol. 57, No. 7, Jul. 1974.
"Chemistry of the Elements" N.N. Greenwood et al., Pergamon Press, New York, 1984, p. 352.

* cited by examiner

Primary Examiner—John Hoffmann
(74) Attorney, Agent, or Firm—Kevin M. Able; Timothy R. Krough

(57) ABSTRACT

The invention includes inventive methods of treating a soot preform. One method includes heating a soot preform to a temperature of less than about 1000° C. and exposing the preform to a substantially halide free reducing agent. Preferred reducing agents include carbon monoxide and sulfur dioxide. Another inventive method of treating the preform includes exposing the preform, in a furnace, to a substantially non-chlorine containing atmosphere comprising carbon monoxide. The preform is heated to a temperature of at least about 1000° C. Preferably this method is incorporated into the process for making an optical fiber. An additional method of treating the preform includes doping the preform with fluorine and exposing the fluorine doped preform to a substantially chlorine free atmosphere comprising at least carbon monoxide at a temperature of at least 1100° C., thereby reacting excess oxygen present in the furnace.

14 Claims, 13 Drawing Sheets

Effect of Carbon Monoxide Treatment of Preform in Core Consolidation on Optical Fiber Hydrogen-Induced Attenuation

• 1200ppm CO in Ramp and Dope w/outgas
--- 1200ppm CO in Ramp Dope and Sinter
—✳— 1200ppm CO in Ramp and Dope
—— Standard without CO

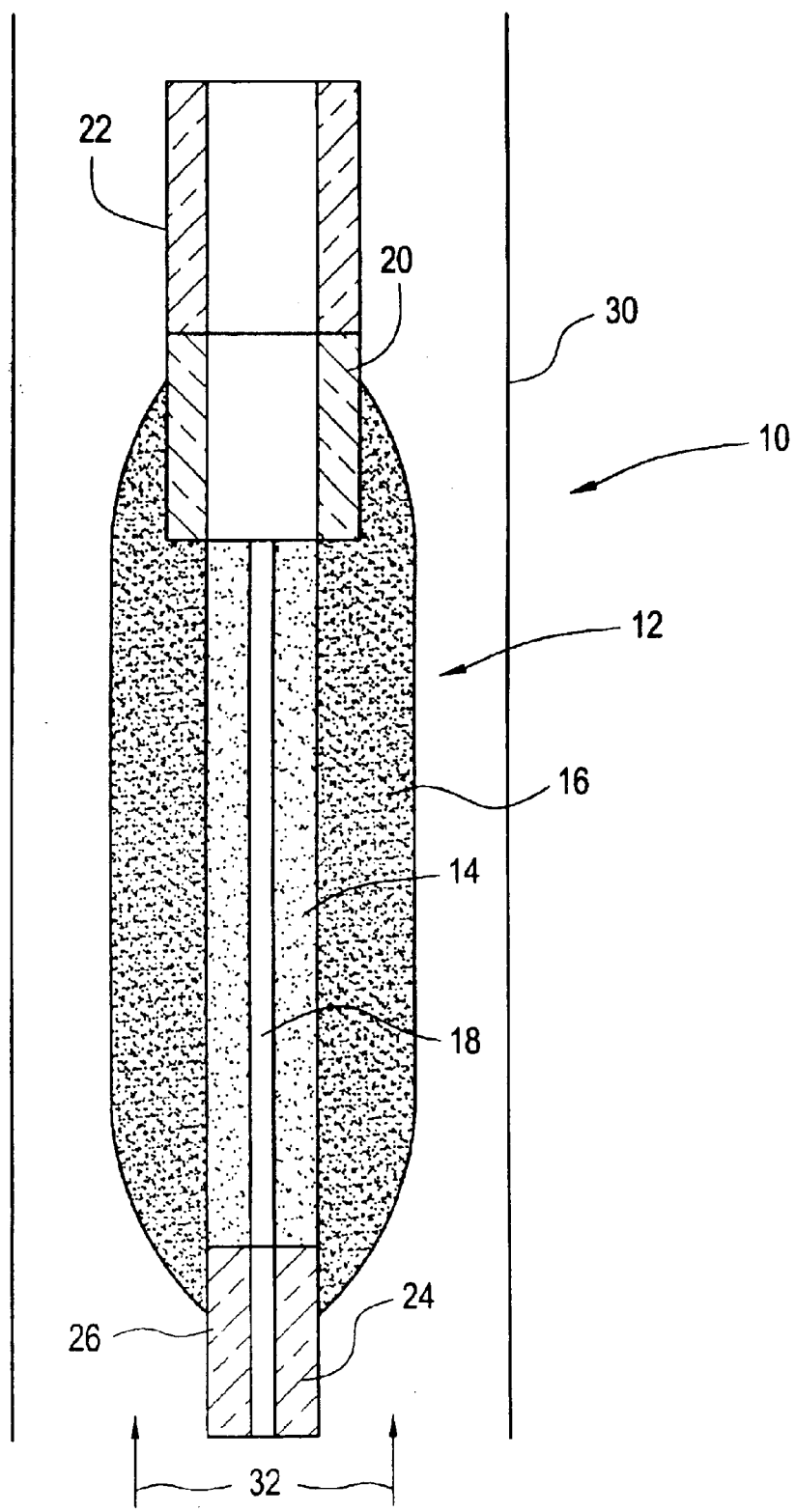

TREATING AN OPTICAL FIBER PREFORM WITH CARBON MONOXIDE

CROSS REFERENCE TO A RELATED APPLICATION

The benefit of priority is hereby claimed by reference to commonly assigned copending U.S. patent application Ser. No. 60/295,052, filed May 31, 2001, and U.S. patent application Ser. No. 60/258,061, filed Dec. 22, 2000 and and both entitled "TREATING SOOT PREFORMS WITH A REDUCING AGENT."

BACKGROUND OF THE INVENTION

1. Field of the Invention

The present invention relates generally to the manufacturing of soot preforms, and particularly to treating a soot preform with a reducing agent.

2. Technical Background

In the manufacturing of optical fibers (hereinafter "fiber") and other products which can be produced from a soot preform, a preform having numerous impurities may cause various defects in the final product. The effect of these defects may be exhibited in terms of attenuation of a signal being propagated along the fiber or a significant reduction in the transmission of a light signal of a certain wavelength through the resultant glass article. In making an optical fiber, it is desired to minimize attenuation and accordingly eliminate the defects that cause the attenuation.

A sign that a fiber includes impurities is that the attenuation the fiber exhibits at a certain wavelength increases the longer the fiber is in operation. This effect of increasing attenuation is most noticeable at wavelengths of at least 1200 nm.

Previous attempts to minimize the potential for a fiber to undergo the above attenuation increases include drying the preform with chlorine gas. Traditionally, the preform is placed in a furnace prior to consolidation. The furnace is charged with a helium gas stream which includes approximately two percent (2%) chlorine ($Cl_2$) and the furnace is heated to a temperature of approximately 1000° C., for up to about two (2) hours. However, treating a soot preform with chlorine gas has not satisfactorily reduced the aforementioned increased attenuation exhibited by the fiber.

Another limitation of the chlorine treatment of a soot preform is that it is limited to glass compositions that are relatively inert to chlorine treatments. Examples of glass compositions that are relatively inert to a chlorine treatment include silica glass or germanium doped silica glass. However, not all components of a silicate glass composition may be inert to the aforementioned chlorine treatment. Examples of such silicate glass compositions that are not inert to the aforementioned chlorine treatment are those compositions that contain alumina, antimony, alkali oxides, boron oxides, phosphorus oxides, or alkaline-earth oxides. The aforementioned chlorine treatment has been found to strip off the alumina, antimony, alkali, or alkaline earth containing compounds from the preform.

The aforementioned chlorine treatment has further proven inappropriate for some glass products that are fluorinated after the chlorine treatment for the reason that the preform will retain some of the chlorine from the chlorine treatment even after the preform is fluorine doped. The retention of chlorine will affect the optical properties of the final glass product. One example of a glass product in which the inclusion of chlorine is not desired is a lithography photomask plate. For example, the presence of chlorine in lithography photomask plates reduces transmission at various wavelengths of interest. One such wavelength is 157 nm. It is has been demonstrated that the presence of only about 75 ppm of chlorine in the photomask plate will reduce transmission by at least about 50% of a light having a wavelength of about 157 nm. For at least the above reasons, there exists a need for new methods to treat a soot preform.

Additionally, fluorine doped optical fibers have exhibited attenuation increases at several wavelengths. The attenuation spectrum of a fluorine doped optical fiber will exhibit absorption peaks in various wavelengths, such as, 1440 nm, 1546 nm, 1583 nm, and 1610 nm. For at least the reason that the 1583 nm wavelength is in L band transmission window, there is a need to make an optical fiber with a fluorine doped region that does not exhibit an absorption peak at a wavelength of 1583 nm or any of the other cited wavelengths.

SUMMARY OF THE INVENTION

The present invention relates to a soot preform that can be used to make optical products and to treating the soot preform. One embodiment of the present invention is a method of treating the soot preform. The method includes exposing a soot preform, in a furnace, to a substantially chlorine free atmosphere comprising at least one reducing agent to consume excess oxygen present in the furnace. A preferred reducing agent is carbon monoxide.

An advantage of practicing the above method of the invention is that it may be used to consolidate a soot preform in an environment that is not an overtly oxidizing environment. The method of the invention may also be practiced to remove excess oxygen from the preform and produce an optical fiber with better long term attenuation properties. A further advantage that will result from practicing the above method is that the fiber draw speed can be increased. One particular excellent application of the invention is including the above described method in a process for the production of a non-zero dispersion shifted optical fiber.

In a second method for practicing the invention, the preform is heated to a temperature of less than about 1000° C. and the preform is exposed to a reducing atmosphere. A preferred reducing atmosphere comprises carbon monoxide.

One advantage of practicing the above embodiment of the invention is that a chlorine free glass may be formed from a preform made in accordance with the above embodiment. A chlorine free glass means at least a preform that has not been exposed to chlorine during manufacturing. A chlorine free glass has an excellent application as a lithography photomask plate, in that a chlorine free photomask can satisfactorily transmit light at a wavelength of less than about 160 nm. Another advantage of practicing the aforementioned embodiment of the invention is that it may be used to treat a soot preform that includes alumina, antimony, an alkali oxide, an alkaline earth oxide, or any other compound that would react with chlorine and volatilize off or are transformed into crystalline chlorides. A further advantage of the above embodiment of the invention is that it may be practiced at low temperatures, temperatures below about 1000° C.

A third method of practicing the invention is a method of making an optical fiber preform. The method includes the step of doping a soot body in an atmosphere comprising carbon monoxide and at least one fluorine containing compound have the general formula $C_nF_{2n+2}$. Preferably "n" is a positive whole number. One advantage of incorporating the aforementioned method of the invention into a process for making an optical fiber with a fluorine containing region is that the fiber does not exhibit an absorption peak at wavelengths of about 1440 nm, about 1546 nm, about 1583 nm, or about 1610 nm.

Additional features and advantages of the invention will be set forth in the detailed description which follows, and in part will be readily apparent to those skilled in the art from the description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 12 is a cross sectional schematic view of a preform in a furnace in accordance with one method of the invention.

DETAILED DESCRIPTION OF THE INVENTION

Figure 1:
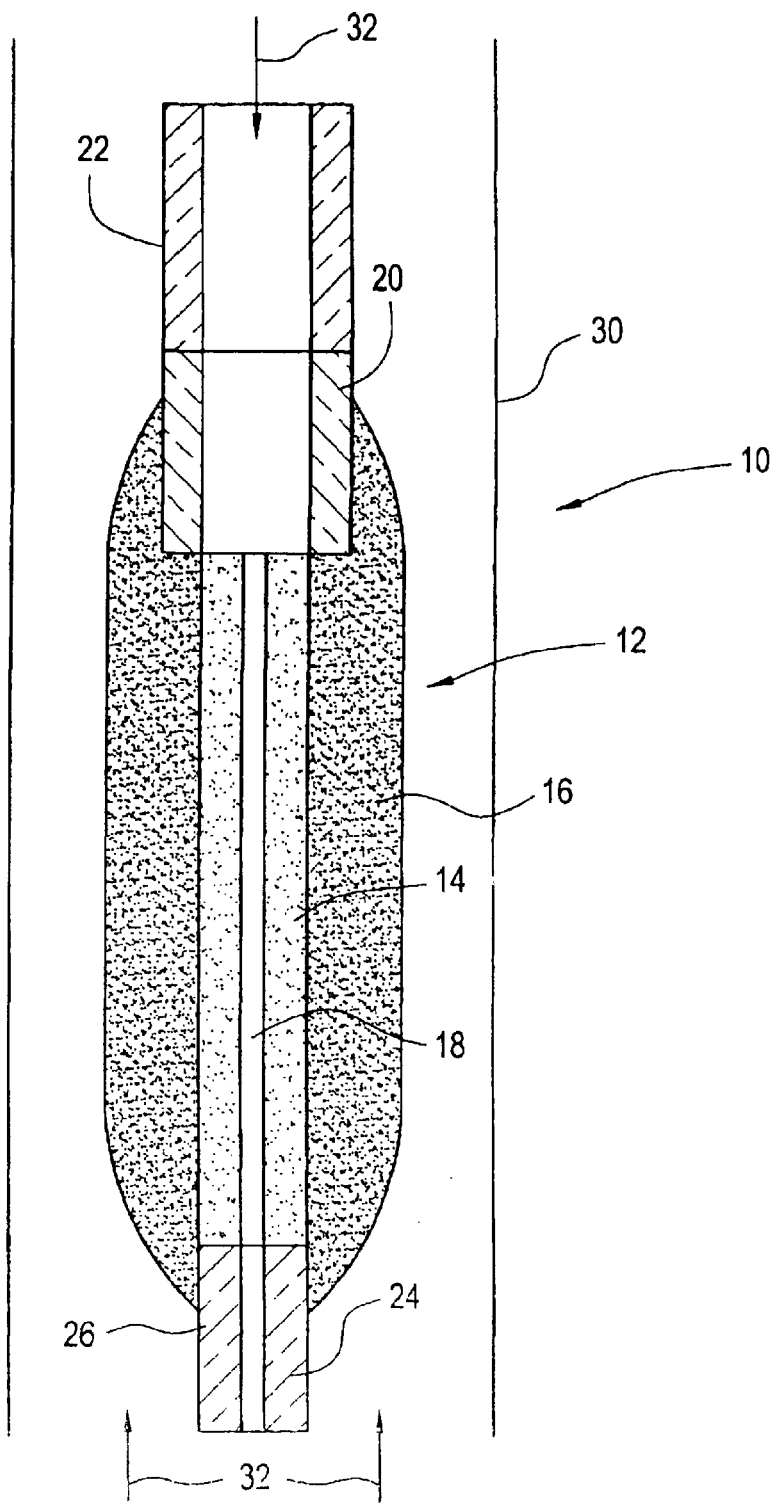
FIG. 1 is a cross sectional schematic view of a preform in a furnace in accordance with the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the method of treating a soot preform with the reducing agent of the present invention is shown in FIG. 1, and is designated generally throughout by reference numeral 10.

The invention described herein relates to a soot preform and inventive methods of treating the soot preform. The preform is treated with a reducing agent. Preferably, the preform is treated with a chlorine free compound comprising CO or $SO_2$.

The Soot Preform

Depicted in FIG. 1, by reference numeral 10, is a soot preform 12 shown in a furnace 30. Soot preform 12 may be formed from any known technique to form a soot body. These techniques include, but are not limited to, outside vapor deposition (OVD), vapor axial deposition (VAD), modified chemical vapor deposition (MCVD), plasma chemical vapor deposition (PCVD), or any other known technique, such as sol-gel processing. OVD, VAD, MCVD, and PCVD may be commonly referred to as chemical vapor deposition (CVD) techniques. Preferably, soot is deposited on a starting member to form preform 12. The typical soot particles deposited on the starting member are less than about 20 microns, preferably less than about 10 microns, more preferably about 0.1 to about 1.0 microns, most preferably about 0.1 to about 0.3 microns.

Preform 12 may have a core region 14 and a cladding region 16. Optionally, preform 12 may have a near cladding region (not shown). Core 14 has a center passage 18. Cladding 16 is disposed around core 14. Core 14 is typically composed of a silica or doped silica. Optionally, core 14 may be doped with germanium to increase the refractive index of core 14. Optionally, core 14 may also include a second dopant such as fluorine or more preferably an annular fluorine doped region. Other potential soot dopants include alkali metal oxides, alkaline earth oxides, transition metals, alumina, antimony oxide, boron oxide, gallium oxide, indium oxide, tin oxide, lead oxide, phosphorus oxide, arsenic oxide, bismuth oxide, tellurium oxide, selenium oxide, titanium oxide, and mixtures thereof. Core 14 may be constructed of a plurality of doped and undoped regions of soot.

Cladding 16 typically includes at least silica. Cladding 16 may have a lower refractive index than the refractive index of core 14. The invention is not limited to the aforementioned materials of construction for core 14 and cladding 16. Preform 12 may be constructed from any oxide based glass.

As depicted in FIG. 1, preferably, preform 12 has a handle 20 that is fused to a standard ball joint handle 22. A plug 24, with an optional capillary tube 26, is located at an end of core 14 opposing handle 20. Preform 12 is suspended in furnace 30 by handle 20.

Methods of Treating a Soot Preform

Treating at temperatures of at least about 1000° C.

A first method of treating a soot preform is directed toward eliminating the increase in attenuation at wavelengths of 1200 nm, or greater, the longer the fiber is in operation. The aforementioned increased attenuation is a post-fabrication defect attributable to the presence of both excess oxygen and at least one reduced germanium compound being proximate to one another in the drawn fiber.

Reduced germanium is a germanium element in the fiber that does not have four (4) bonds to oxygen elements in the fiber. A non-exhaustive list of reduced germanium compounds that may be present in the fiber include $Ge^{+2}$, $GeO^{+1}$, and Ge—Ge. By proximate it is meant that the excess oxygen is within about 5 nm of a reduced germanium compound, more preferably within about 1 nm of the reduced germanium compound, and most preferably within about 0.5 nm of the reduced germanium compound. One potential cause of the presence of excess oxygen in the drawn fiber is consolidating the soot preform in an environment which includes excess oxygen. Consolidating is defined as heating preform 12 at temperatures above about 800° C. to perform various process steps such as, but not limited, to drying, doping, and sintering the soot preform. Excess oxygen is defined as the amount of oxygen present in the environment that is above the amount of oxygen that is necessary to be present for these consolidation steps to be performed. A few potential causes for the excess oxygen include tramp oxygen, leakage into the consolidation furnace, and oxygen generated during the consolidation process.

In this method of the invention, it is preferred that soot preform 12 includes at least one germanium doped region, more preferably at least two germanium doped regions. Preform 12 is treated in furnace 30 with a reducing agent to eliminate any excess oxygen from the atmosphere in furnace 30. The reducing agent flows into contact with preform 12 in the direction of arrows 32 to eliminate the excess oxygen. An example of a preferred reducing agent is CO. Preferably, the reducing agent will react with the excess oxygen to form a stable reaction product and consume the excess oxygen. For example, CO will react with the excess oxygen to form $CO_2$. Another example of a suitable reducing agent is a buffered CO, such as a mixture of $CO/CO_2$ gas.

In addition to the reducing agent, the atmosphere in the furnace may optionally include an inert material such as helium, argon, nitrogen, or mixtures thereof. The inert material is not limited to only the cited materials. Preferably, the atmosphere is substantially devoid of any chlorine containing compounds. In the case that the treating atmosphere includes carbon monoxide and an inert material, and preform 12 is not doped with fluorine, the concentration of the carbon monoxide is at least about 100 ppm and no more than about 3000 ppm, more preferably at least about 200 ppm, most preferably about 300 to about 600 ppm.

The reducing agent may be charged into furnace 30 during a drying operation of preform 12 or during sintering of preform 12. In the case that furnace 30 is charged with the reducing agent during a drying phase, preform 12 is heated to a drying temperature of about 1000 to about 1200° C. Preferably, preform 12 is heated to about 1100 to about 1200° C. Preform 12 is maintained at the drying temperature for a period of about one (1) to about six (6) hours. Preferably preform 12 is maintained at the drying temperature for about four (4) hours. Preferably, the atmosphere in furnace 30 during the drying operation is a halide free atmosphere. Practicing the invention will result in the production of a preform (a.k.a. blanks) with significantly reduced concentrations of impurities and a fiber which does not exhibit the aforementioned attenuation increases.

Optionally during drying or sintering, preform 12 may be doped with fluorine. Fluorine doping is accomplished by heating preform 12 to doping temperature in the range from about 1000° C. to about 1600° C. Once preform 12 is heated to the appropriate doping temperature, preform 12 is exposed to a doping gas. Preferably, the doping gas includes at least one of the following fluorine containing gases consisting of $CF_4$, $SiF_4$, $C_2F_6$, $SF_6$, $F_2$, $C_3F_8$, $NF_3$, $ClF_3$, $BF_3$, chlorofluoro-carbons, and mixtures thereof. Preform 12 is exposed to the doping gas for a period of about one (1) to about six (6) hours. Preferably, the reducing agent is present in the doping atmosphere.

Another optional step includes treating soot preform 12 with a halide containing compound such as $Cl_2$ or $GeCl_4$ prior to either the fluorine doping of preform 12 or prior to both the fluorine doping of the preform 12 and the reducing agent treatment of preform 12. Preferably, the halide containing compound is purged from the atmosphere in furnace 30 prior to charging furnace 30 with the reducing agent. Preferably, the halide containing gas is a metallic halide containing compound or a dihalide compound. The preferred temperature for treating preform 12 with a halide containing compound is about 800° C. to about 1200° C., more preferably, the temperature is about 1000° C. to about 1100° C. It is preferred that the halide treatment of preform 12 last for about one (1) hour to about four (4) hours, more preferably about two (2) hours. During the halide treatment, the atmosphere in furnace 30 may also include an inert material such as helium, argon, or nitrogen as previously noted. Preferably after the halide treatment of preform 12, the atmosphere of furnace 30 is purged with an inert gas for at least about five (5) minutes to no more than about two (2) hours.

After treating preform 12 with the reducing agent, center passage 18 may be closed and preform 12 is sintered. One optional technique to close passage 18 is applying vacuum to center passage 18. To sinter preform 12, optionally the reducing agent may be discharged from furnace 30 and furnace 30 is heated to a temperature of about 1200 to about 1600° C., more preferably about 1400° C. or more. Optionally, the atmosphere in furnace 30 during sintering may contain the reducing agent. It is preferred that sintering occurs in an atmosphere that contains at least an inert gas, such as helium, argon, or any of the other inert materials previously noted. A suitable period of time for sintering preform 12 is about half an hour (0.5) to about six (6) hours. In a preferred embodiment, the sintering time is about four (4) to about six (6) hours. However, the sintering time period may vary depending on the sintering temperature, the size and density of the preform, and the chemical composition of the preform. Sintering may occur in the same furnace as drying or in a different furnace.

In the case that the core region 14 contains a dopant such as germanium, preferably the germanium is deposited in excess to account for any side reaction between the reducing agent and the deposited germanium dioxide.

Figure 2:
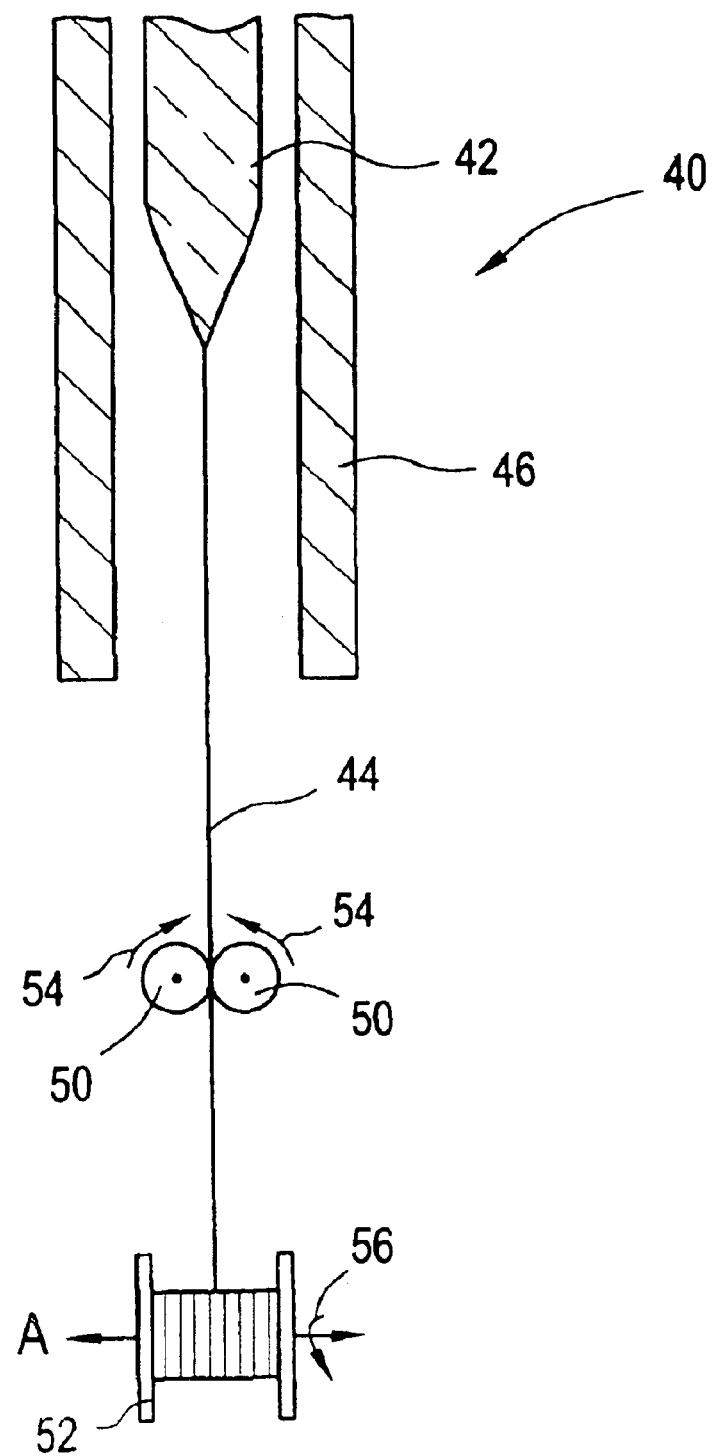
FIG. 2 is a partial cross sectional schematic view of a consolidated preform being drawn into an optical fiber.

As shown in FIG. 2, designated reference numeral 40, sintered preform 42 may be drawn into a fiber 44. Sintered preform 42 is heated to a temperature of about 1800° C. or more and drawn into fiber 44. Preferably, sintered preform 42 is transported to a draw furnace 46 for drawing preform 42 into fiber 44. It is preferred that a muffle is disposed at an exit of draw furnace 46. Fiber 44 is pulled by tractors 50 and stored on a spool 52. Tractors 50 rotate in the direction of arrows 54. Spool 52 rotates in the direction of arrow 56 around axis A. Typical draw rates are about 10 m/s or more, preferably about 20 m/s or more. Preferably, the fiber is drawn under a tension of about 75 to about 200 grams, more preferably about 90 to about 150 grams.

In another embodiment of this method, the reducing agent treatment may take place only during sintering. Preferably, the soot is non-fluorine doped soot. In this embodiment, the reducing agent is charged into furnace 30 and the furnace is heated to a sintering temperature of about 1200 to about 1600° C., more preferably a temperature of about 1400° C. or more. The time period for the sintering step is at least about half an hour (0.5) to about six (6) hours. Preferably, the concentration of the reducing agent in the sintering atmosphere is about 300 to about 600 ppm. Optionally, the sintering step may conclude with exposing preform 12 to an inert gas for about half an hour (0.5).

In an additional embodiment of the aforementioned method, the preform 12, as shown in FIG. 1, is a core cane preform, meaning that the preform may be drawn into a core cane. In this embodiment, additional soot is deposited onto preform 12 after preform 12 is drawn into a core cane. Preferably, the refractive index of the additional soot is not higher than the refractive index of the core region having the highest refractive index. An example of a preferred material deposited on the core cane is silica ($SiO_2$). The silica may be doped with an refractive index increasing dopant or a refractive index decreasing dopant. The soot coated core cane is also known as an overcladded preform or an overcladded core cane.

Figure 3:
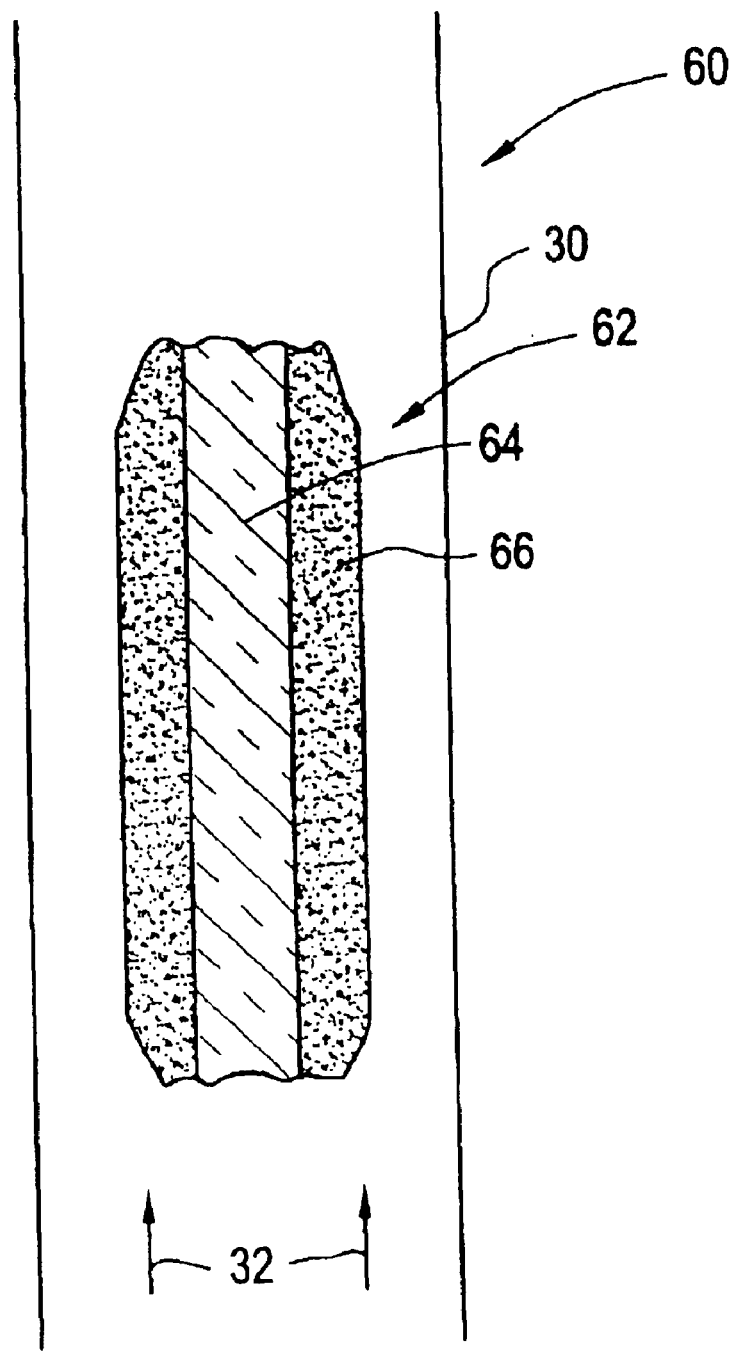
FIG. 3 is a partial cross sectional schematic view of a soot coated core cane in a furnace in accordance with the invention.

The overcladded preform may be disposed in a furnace and treated with the reducing agent, as shown in FIG. 3 and designated reference numeral 60. The overcladded preform 62 includes core cane 64 and at least one additional layer of soot 66 deposited on cane 64. Preferably cane 64 has been sintered into glass. The reducing agent is the same as previously described. The furnace is heated to the aforementioned temperature ranges (about 800 to about 1200° C. or about 1200 to about 1600° C.) for the aforementioned time periods (about 0.5 to about 6 hours). It is preferred that preform 62 is exposed to the reducing agent during sintering.

The aforementioned method of the invention will minimize the potential for excess oxygen to be present in furnace 30 during consolidation. Therefore, a fiber drawn from a preform that has been treated as described above will not exhibit the aforementioned increased attenuation.

The above method of treating a soot preform with a reducing agent has an excellent application in the manufacturing of a non-zero dispersion shifted optical fiber, e.g. Corning® Submarine LEAF® fiber available from Corning, Incorporated of Corning, N.Y. A non-zero dispersion shifted optical fiber is a fiber, preferably a segmented core fiber, having the following properties listed in table A, with various definitions following the table:

TABLE A

| Property | Preferred | More Preferred | Most Preferred |
|---|---|---|---|
| Attenuation @ 1550 nm | About 0.28 dB/km or less | About 0.23 dB/km or less | About 0.18 dB/km or less |
| Attenuation in λ range of 1525–1575 nm | About 0.28 dB/km or less | About 0.23 dB/km or less | About 0.18 dB/km or less |
| Mode Field Diameter @ 1550 nm | About 8.5 to about 10.0 μm | About 8.95 to about 9.6 μm | About 9.0 to about 9.55 μm |
| Total Dispersion @ 1560 nm | About −4.0 to about −0.5 ps/nm-km | About −3.4 to about −1.0 ps/nm-km | About −3.4 to about −1.1 ps/nm-km |
| Zero Dispersion λ ($\lambda_0$) | About 1560 to about 1595 nm | About 1567 to about 1589 nm | About 1580 nm |
| Zero Dispersion Slope ($S_0$) | About 0.15 ps/$nm^2$-km or less | About 0.12 ps/$nm^2$-km or less | About 0.11 ps/$nm^2$-km or less |
| Effective Area ($A_{eff}$) | No more than about 200 $\mu m^2$ | At least about 65 $\mu m^2$ | At least about 71 $\mu m^2$ |
| Bend Induced Attenuation @ 1550 nm for fiber wrapped 1 time around a 32 mm diameter mandrel | No more than about 0.50 dB | Less than about 0.50 dB | |
| Bend Induced Attenuation @ 1550 nm for fiber wrapped 100 times around a 75 mm diameter mandrel | No more than about 0.05 dB | Less than about 0.05 dB | |

The below definitions are provided to assist in defining the above properties.

DEFINITIONS

The following definitions are in accord with common usage in the art.

The refractive index profile is the relationship between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The effective area is $A_{eff}=2\pi(\int E^2 \, r \, dr)^2/(\int E^4 \, r \, dr)$, where the integration limits are 0 to ∞, and E is the electric field associated with light propagated in the waveguide. An effective diameter, $D_{eff}$, may be defined as, $A_{eff}=\pi(D_{eff}/2)^2$.

By large effective area, we mean that the effective area of the fiber is greater than about 60 $\mu m^2$, more preferably the effective area of the fiber is greater than about 65 $\mu m^2$, and most preferably the effective area of the fiber is greater than 70 $\mu m^2$. It is possible and preferable to have a fiber with an effective area of greater than about 80 to 90 $\mu m^2$.

The relative refractive index percent, $\Delta\%=100\times(n_i^2-n_c^2)/2n_i^2$, where $n_i$ is the maximum refractive index in region i, unless otherwise specified, and $n_c$ is the average refractive index of the cladding region unless otherwise specified.

The term α-profile refers to a refractive index profile, expressed in terms of Δ(b) %, where b is radius, which follows the equation, $$\Delta(b)\% = \Delta(b_o)(1-[|b-b_o|]/(b_1-b_o)]^\alpha),$$

where $b_o$ is the point at which $\Delta(b)$ % is maximum, $b_1$ is the point at which $\Delta(b)$ % is zero, and b is in the range $b_i \leq b \leq b_f$, where delta is defined above, $b_i$ is the initial point of the α-profile, $b_f$ is the final point of the α-profile, and α is an exponent which is a real number. The initial and final points of the α-profile are selected and entered into the computer model. As used herein, if an α-profile is preceded by a step index profile or any other profile shape, the beginning point of the α-profile is the intersection of the α-profile and the step profile or other profile.

The above attenuation may be measured in accordance with U.S. Pat. No. 5,534,994, issued Jul. 9, 1996, the specification of which is incorporated herein. Other operating procedures that may be used to measure attenuation include FOTP-78, FOTP-67, FOTP-20A, or TIA 455–67.

This method of the invention may also apply to fibers having at least one germanium doped region and at least one fluorine doped region. In this embodiment of the method, preform 12 includes at least one germanium doped region, preferably formed during a soot deposition phase and a fluorine doped region. Preferably, preform 12 includes at least one fluorine doped region. The fluorine doped regions may be formed during the fluorine doping step as described above or during soot deposition. The fluorine doping step may take place at temperatures of about 1100° C. or more. The germanium doped regions and the fluorine doped regions may be distinct regions of preform 12, the regions may overlap, at least one region in preform 12 may contain both germanium and fluorine, or some combination of the aforementioned fluorine and germanium regions.

In this embodiment, preferably, preform 12 is treated with the reducing agent during sintering. However, this embodiment of the invention is not limited to treating preform 12 during sintering only. Optionally, preform 12 may be treated during sintering and the fluorine doping step. Preferably, the temperature of the reducing agent atmosphere is at least about 1100° C., more preferably at least about 1300° C. As previously stated, it is preferred that the reducing agent atmosphere is substantially devoid of a chlorine containing compound or element.

For a fluorine doped preform, preferably the concentration of the reducing agent in the atmosphere is on the same order of magnitude as the concentration of the fluorine doping agent in the doping atmosphere. The same order of magnitude is used herein to mean that the concentration of the reducing agent in the reducing atmosphere is at least about one-tenth (1/10) to no more than about three times (3x) the concentration of fluorine in the fluorine doping atmosphere. For example if the concentration of a $CF_4$ in doping atmosphere is about 1% by weight, a preferred concentration of CO reducing agent is at least about 0.5% by weight, more preferably at least about 1.0% by weight. The invention is not limited to the following example.

One reason that it is advantageous to treat a fluorine doped preform with the reducing agent is that the fluorine doping process will generate excess oxygen in the doping atmosphere. The fluorine is incorporated into preform 12 in accordance with the following chemical reactions:

  (1)

and

  (2)

The reducing agent will react with the oxygen generated from the fluorine doping reaction to form $CO_2$. It is preferred that the amount of reducing agent in the atmosphere is greater than the stoichiometric amount of the oxygen generated during the fluorine doping reaction, so that additional reducing agent is available to react with excess oxygen present in the consolidation process. A non-exhaustive list of potential sources of excess oxygen includes tramp oxygen, oxygen leakage into the consolidation process, oxygen generated during the consolidation process, and residual oxygen in the consolidation gases. A reducing agent treatment as described above will consume any excess oxygen present in the furnace.

Optionally, preform 12 may be treated with a chlorine containing atmosphere prior to fluorine doping or the reducing treatment. The preferred chlorine treatment step is the same as previously described above. The chlorine treatment step is not required to practice this method of the invention.

A fiber having a fluorine doped region which is made in accordance with the above method will not exhibit the aforementioned increase in attenuation the longer the fiber is in operation. The fiber is drawn from preform 12 in the same manner as described above.

Figure 11:
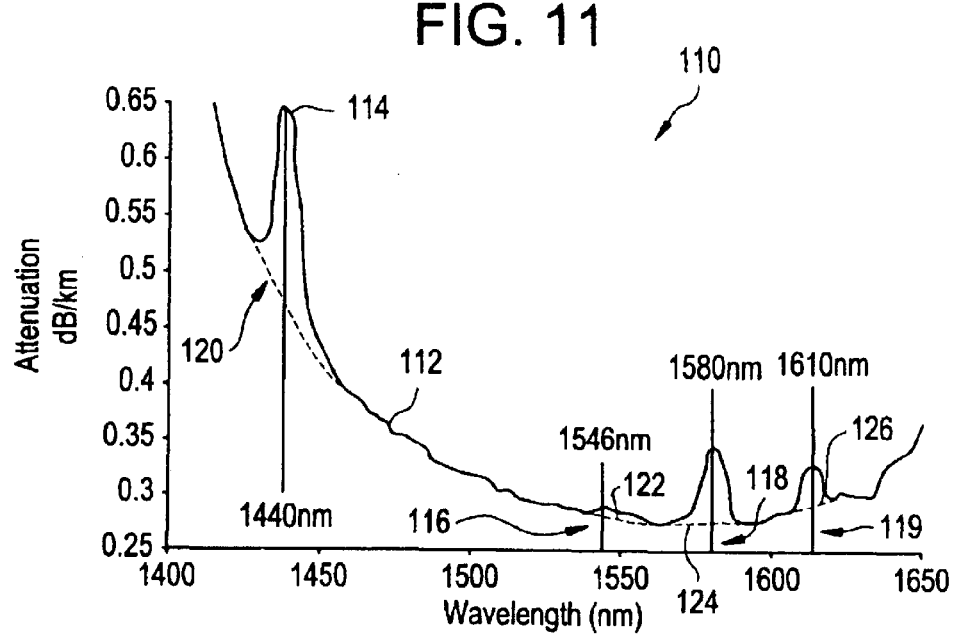
FIG. 11 is an example of a spectrum of attenuation versus wavelength exhibited by an optical fiber having a fluorine doped section. The optical fiber is made by conventional processes.

The invention may also be practiced to eliminate absorption peaks on the attenuation spectrum of a fluorine doped fiber. An absorption peak is a region along the spectrum where the attenuation deviates from the base line attenuation. Typically the deviation is an increase in attenuation. In referring to FIG. 11, the attenuation spectrum of an optical fiber having a fluorine doped section made in accordance with conventional method is illustrated and generally designated as 110. The results of the spectrum are shown as line 112. The analysis 110 has an absorption peak 114 at about 1440 nm, a second absorption peak 116 at about 1546 nm, and a third absorption peak 118 at about 1580, and a fourth absorption peak 119 at about 1610 nm. The absorption peaks 114, 116, 118, and 119 are shown on FIG. 11 as a deviation between the exhibited attenuation and the base line of analysis 110, shown as dashed lines 120, 122, 124, and 126 respectively. Absorption is the portion of attenuation resulting from conversion of the optical power of the light signal into heat.

The attenuation spectrum of an optical fiber can be measured by various techniques. One source of known measurement techniques is Optical Fiber Telecommunications edited by Stewart E. Miller and Alan G. Chynoweth. Pages 214–218 of Optical Fiber Telecommunications are incorporated herein by reference. Examples of types of equipment that may be used to make the aforementioned measurements include the PK attenuation benches available from GN Nettest of Hopkinton, Mass. One example of a suitable PK bench is a PK-2500.

In analyzing numerous optical fibers having fluorine doped sections, it was discovered that the fiber can have at least four (4) different absorption peaks. The wavelengths at which the absorption peak are present include nominally about 1440 nm (preferably at least about 1400 nm, more preferably at least about 1410 nm, and most preferably at least about 1420 nm, and preferably about no more than about 1470 nm, more preferably no more than about 1460 nm, and most preferably no more than about 1450 nm), nominally about 1546 nm (preferably at least about 1520 nm, more preferably at least about 1530 nm, and most preferably at least about 1540 nm, and preferably no more than about 1560 nm and more preferably no more than about 1555 nm, and most preferably no more than about 1550 nm), nominally about 1583 (preferably at least about 1565 nm, more preferably at least about 1570 nm, and most preferably at least about 1575 nm and preferably no more than about 1595 nm, more preferably no more than about 1590 nm, and most preferably no more than about 1585 nm.), and nominally about 1610 nm (preferably at least about 1595 nm, more preferably at least about 1600 nm, and most preferably at least about 1605 nm and preferably no more than about 1625 nm, more preferably no more than about 1620 nm, and most preferably no more than about 1615 nm).

The inventors have discovered that a cause of the aforementioned absorption peaks is doping preform 12 during consolidation with a fluorine compound having the general formula $C_nF_{2n+2}$, wherein "n" is a positive whole number. It was determined that the aforementioned absorption peaks appear on the spectral analysis due to the presence of at least one of the following compounds in the optical fiber: CO, $CO_2$, $COF_2$, COClF, $C_nF_{2n+2}$, and mixtures thereof. Examples of general equations regarding how the above compounds are formed is below in terms of $CF_4$ (The equation is not stated in stoichiometric terms).

$$CF_4+SiO_2 \leftrightharpoons CO+CO_2+COF_2+SiF_x$$

$$CF_4+SiO_2+Cl_2 \leftrightharpoons CO+CO_2+COF_2+SiF_x+COClF$$

The term "x" is a number between about one (1) to about four (4), preferably about one (1) to about three (3).

Figure 14:
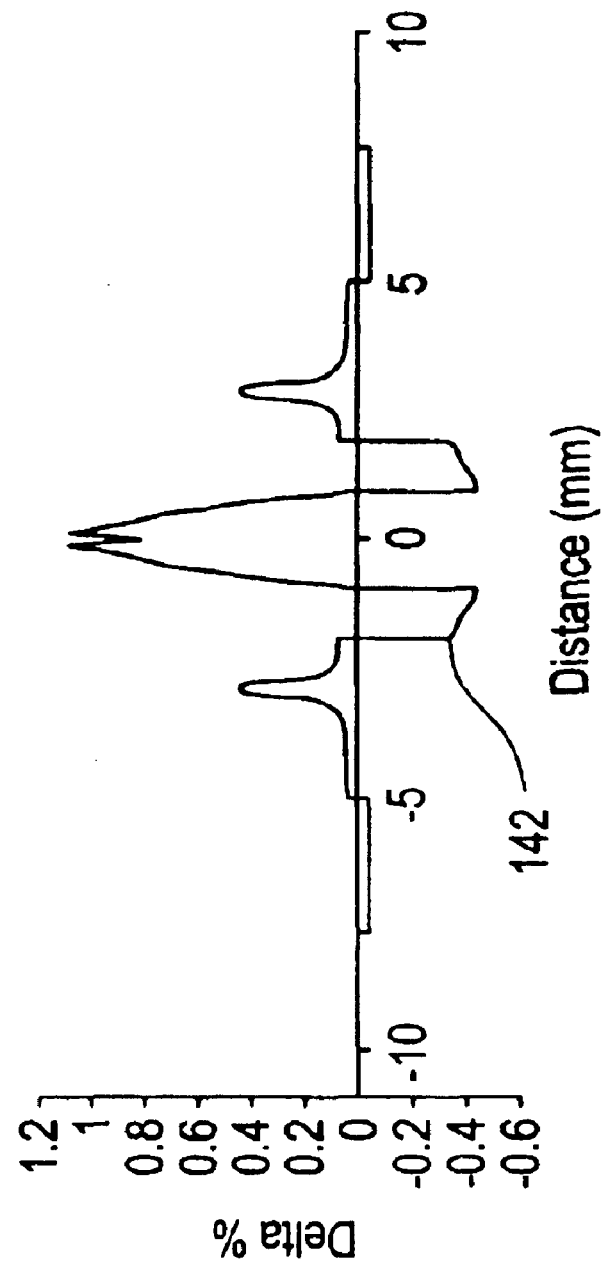
FIG. 14 is a refractive index profile profile of an optical fiber in terms of delta percent as a function of radius which exhibits a region of depressed refractive index.

It has also been determined that the magnitude of the absorption peak can be greater for an optical fiber having a delta percent (Δ%) of about −0.35% or less, preferably −0.38% or less. Delta percent is the relative refractive index percent, $\Delta\% = 100 \times (n_i^2 - n_c^2)/2n_i^2$, where $n_i$ is the maximum refractive index in region i, unless otherwise specified, and $n_c$ is the average refractive index of the cladding region unless otherwise specified. The delta percent value stated above is a maximum depression for a region of depressed refractive index of the fiber. An example of this is illustrated in FIG. 14, generally designated 140. FIG. 14 is a refractive index profile for an optical fiber in terms of delta percent as a function of radius. The refractive index profile 140 has a maximum delta percent of less than about −0.4, designated as 142.

One embodiment of a method to eliminate the aforementioned absorption peaks is generally a method of making an optical fiber preform. The method includes doping a soot body in an atmosphere comprising carbon monoxide and at least one fluorine containing compound have the general formula $C_nF_{2n+2}$, wherein "n" is a positive whole number. Preferably, the doping atmosphere comprises at least about 5% by volume of the fluorine containing compound, more preferably at least about 10% by volume, even more preferably at least about 15% by volume, and most preferably at least about 20% by volume. It is also preferred that the atmosphere does not comprise more than about 50% by volume of the fluorine containing compound. The soot body can be anyone of the aforementioned embodiments of soot body 12 shown in FIG. 1. An embodiment of this method of the invention is depicted in FIG. 12. FIG. 12 differs from FIG. 1 in that the gas 32 containing carbon monoxide and the fluorine containing compound are flown in the direction of arrow 32, only along an outside of preform 12 and not through a center of preform 12. However, the invention is not limited to the embodiment shown in FIG. 12. A non-exhaustive list of preferred fluorine containing compounds includes $CF_4$, $C_2F_6$, or $C_3F_8$, a more preferred compound is $CF_4$.

Preferably, the above method may further comprise an additional step of exposing the soot body to a substantially halide free atmosphere containing carbon monoxide. Preferably the exposing step is performed before the doping step. Optionally, the exposing step may be performed after an optional chlorine treatment step. Preferably, the furnace is purged between the chlorine treatment step and the optional exposing step. In addition, the exposing step may be performed during a ramping step of heating the soot preform from the final chlorine treatment temperature to a fluorine doping temperature. Temperatures and times for the chlorine step and the doping step are the same as previously described in the application. In one embodiment of this method of the invention, the atmosphere during the exposing step is a substantially chlorine free atmosphere. Preferably the temperature of the preform during the exposing step is at least about 1000° C., more preferably at least about 1100° C., and most preferably at least about 1200° C.

In the case that the exposing step includes ramping the temperature, preferably, the temperature in the furnace is increased from the more than about 1000° C. to more than about 1200° C., more preferably at least about 1000° C. to at least about 1200° C., and most preferably at least about 1000° C. to at least about 1300° C.

The exposing step may take any where from about fifteen (15) minutes to about sixty (60) minutes, preferred time periods for the exposing step include about thirty (30) minutes, about forty-five (45) minutes, and about sixty (60) minutes. The temperature in the furnace is increased at a rate of about 2° C. to about 10° C. per minute. The rate of temperature increase during the exposing step may vary. Also, the temperature during the heating of the exposing step is not required to rise continuously throughout the entire time period of the exposing step. However, the invention is not limited to increasing the temperature in the furnace during the exposing step. The exposing step may occur at isothermal conditions or a portion of the exposing step may occur at isothermal conditions.

It is preferred that the atmosphere in the furnace during the exposing step comprises an inert material and carbon monoxide, the ratio of carbon monoxide to inert material is at least about 0.0012. It is further preferred that the ratio comprises no more than about 0.48. The inert material may be any inert gas such as, but not limited to, argon, nitrogen, helium, and mixtures thereof. Additionally, the concentration of the carbon monoxide in the furnace during any exposing step may preferably comprise at least about 300 ppm, more preferably at least about 600 ppm, most preferably at least about 1200 ppm. Furthermore, the concentration may preferably comprises up to about 4800 ppm, more preferably up to about 4000 ppm, and most preferably up to about 3000 ppm.

The concentration of carbon monoxide in the furnace during the doping step may be any one of the aforementioned concentrations regarding the exposing step. The concentration of carbon monoxide in the furnace during the doping step is not required to be the same as the concentration of carbon monoxide in the furnace during the exposing step. The aforementioned ratios of carbon monoxide to an inert material regarding the exposing step optionally may also be implemented in practicing the doping step, however, the ratios are not required to be the same as during the doping step.

The method may include further sintering the perform as set forth above. Alternatively, the invention may include sintering the preform in an atmosphere which includes carbon monoxide. Except for the addition of carbon monoxide to the sintering atmosphere, the preform is sintered in the same manner as previously disclosed above. The concentration of carbon monoxide may be the same as described with respect to the exposing step, however, the concentration of carbon monoxide in the sintering atmosphere is not required to be the same as the concentration of carbon monoxide in the furnace during any other step.

Furthermore the invention may include drawing the preform into an optical fiber. In drawing the fiber from the furnace, preferably, the fiber exits the furnace and passes through a chamber that is filled with a gas having a low thermal conductivity relative to helium. The temperature of the gas is preferably less than the temperature of the drawn fiber. More preferably, the temperature of the gas is about room temperature or less. Examples of low thermal conductivity gases include, nitrogen, argon, air, and mixtures thereof. The chamber may be positioned adjacent the fiber exit of the draw furnace or further down stream from the fiber exit of the draw furnace. This chamber may be referred to as a treatment furnace or a lower extended muffle (LEM). For additional description regarding the LEM, U.S. Patent application entitled "Methods and Apparatus for Forming Optical Fiber", filed on or about May 30, 2001, is incorporated herein by reference.

One particular embodiment of the invention includes warming up the furnace for about 10 minutes, preferably about 5 minutes, and more preferably about 3 minutes, with preform 12 already in the furnace. Preferably the furnace has two zones, a zone 1 (A.K.A. consolidation zone) and a zone 2 (A.K.A. sintering zone) and independent temperature controls for each zone. Zone 1 of the furnace is heated to a temperature of about 1200° C. or more, preferably about 1225° C. or more. Zone 2 of the furnace is heated to about 1300° C. or more, preferably about 1325° C. or more, more preferably 1350° C. or more, and most preferably about 1380° C. or more. During the warm-up, the furnace is charged with about 10 standard liters per minute ("slpm") of inert gas, preferably about 15 slpm, and more preferably about 20 slpm.

Preferably the preform is treated in zone 1 of the furnace in an atmosphere of about 2.2% chlorine for at least about thirty (30) minutes, more preferably about forty-five (45) minutes, and most preferably at least about sixty (60) minutes. The temperature in the furnace is preferably the same as during the warm-up step. During the chlorine step, about 20 slpm of helium and about 0.45 slpm of chlorine are flown into the furnace. Preferably after the chlorine step, the atmosphere in the furnace is discharged from the furnace.

Next, the preform 12 is exposed to an atmosphere of helium and carbon monoxide at the above cited temperatures. The exposure may last from anywhere between about fifteen minutes (15) to about forty-five (45) minutes. The exposure atmosphere comprises helium and carbon monoxide, about 19.00 slpm of helium. Preferably about 19.24 slpm (More preferably about 19.48 slpm, and most preferably at least about 19.76) and about 1.00 slpm of carbon monoxide (more preferably about 0.76 slpm, and most preferably at least about 0.52 slpm, and most preferably no more than about 0.45 slpm) are charged into the furnace. Preferably, the carbon monoxide was a 10% mixture of carbon monoxide and helium.

The embodiment additionally includes doping preform 12 in an atmosphere comprising helium, carbon monoxide, and $CF_4$. The flowrate of helium into the furnace is about 14.00 slpm, preferably about 14.5 slpm, more preferably about 15.0 slpm, and most preferably about 15.76 slpm. The flowrate of $CF_4$ into the furnace comprises at least about 2 slpm, preferably at least about 3 slpm, and most preferably at least about 4 slpm. The flowrate of carbon monoxide into the furnace is at least about 0.020 slpm and preferably at least about 0.024 slpm. The time period of the doping step comprises at least about 30 minutes, preferably at least about 45 minutes, more preferably at least about 60 minutes, and most preferably at least about 90 minutes.

The embodiment further includes outgassing the doping atmosphere from the furnace. During the outgassing step, the temperature in zone 2 of the furnace is increased to at least about 1400° C., preferably at least about 1420° C., and more preferably at least about 1440° C. An atmosphere in the furnace during the outgassing step comprises helium and carbon monoxide. Preferably at least about 19.0 slpm of helium is charged into the furnace, more preferably at least about 19.5 slpm, and most preferably at least 19.76 slpm. Preferably the flow rate of carbon monoxide into the furnace is at least about 0.020 slpm and more preferably at least about 0.024 slpm. Preferably, a time period for the outgassing of the doping atmosphere comprises at least about 10 minutes, more preferably at least about 20 minutes, and most preferably at least about 30 minutes.

Next, the preform is sintered by moving the preform into zone 2 of the furnace at a rate of at least about 4 mm per minute. The rate may be as high as about 12 mm per minute, a preferred rate is about 8 mm per minute. The temperature in zone 2 of the furnace is maintained at least about 1400° C., preferably at least about 1420° C., and more preferably at least about 1440° C. The time period to sinter the preform is at least about 120 minutes, preferably at least about 150 minutes, and more preferably at least about 170 minutes. During the sintering step an atmosphere of carbon monoxide and helium is charged into the furnace. Preferably at least about 19.0 slpm of helium is charged into the furnace, more preferably at least about 19.5 slpm, and most preferably at least 19.76 slpm. Preferably the flow rate of carbon monoxide into the furnace is at least about 0.020 slpm and more preferably at least about 0.024 slpm.

Once the preform has completely moved into zone 2 of the furnace and the sintering step is completed, the preform is maintained in zone 2 of the furnace for a period of less than about 5 minutes, preferably less than about 3 minutes, more preferably less than about 2 minutes, and most preferably for about 1 minute in an atmosphere of helium. Preferably 20 slpm of helium is charged into the furnace during this step.

This particular embodiment of the invention is concluded with a finish step. During the finish step, the temperature in zone 2 of the furnace is lowered to less than about 1400° C., preferably less than about 1390° C., and most preferably about 1380° C. The atmosphere in the furnace during the finish step preferably comprises argon. Preferably, the argon is charged into the furnace at more than about 10 slpm, more preferably more than about 15 slpm. And most preferably at least about 20 slpm.

Preferably, an attenuation spectrum of the resultant fiber exhibits an attenuation that does not deviate by more than about 0.012 dB/km over a range of wavelengths of about 1565 nm to about 1595 nm. More preferably, the deviation is not more than about 0.006 dB/km, even more preferably not more than about 0.003 dB/km, and most preferably the deviation is about zero. More preferably the range of wavelengths comprises about 1570 nm to about 1590 nm and most preferably about 1575 nm to about 1585 nm.

Preferably, the attenuation spectrum of the resultant fiber exhibits an attenuation that does not deviate by more than about 0.012 dB/km over a range of wavelengths of about 1400 nm to about 1470 nm. More preferably, the deviation is not more than about 0.006 dB/km, even more preferably not more than about 0.003 dB/km, and most preferably the deviation is about zero. More preferably the range of wavelengths comprises about 1410 nm to about 1460 nm and most preferably about 1420 nm to about 1450 nm.

Preferably, the attenuation spectrum of the resultant fiber exhibits an attenuation that does not deviate by more than about 0.010 dB/km over a range of wavelengths of about 1520 nm to about 1560 nm. More preferably, the deviation is not more than about 0.006 dB/km, even more preferably not more than about 0.003 dB/km, and most preferably the deviation is about zero. More preferably the range of wavelengths comprises about 1530 nm to about 1555 nm and most preferably about 1540 nm to about 1550 nm.

Preferably, The attenuation spectrum of the resultant fiber exhibits an attenuation that does not deviate by more than about 0.012 dB/km over a range of wavelengths of about 1595 nm to about 1625 nm. More preferably, the deviation is not more than about 0.006 dB/km, even more preferably not more than about 0.003 dB/km, and most preferably the deviation is about zero. More preferably the range of wavelengths comprises about 1600 nm to about 1620 nm and most preferably about 1605 nm to about 1615 nm.

Preferably the spectrum of the drawn fiber will not exhibit at least one of the aforementioned absorption peaks (nominally about 1440 nm, about 1543 nm, about 1583 nm, and about 1610 nm). More preferably the spectrum does not exhibit at least two of the aforementioned absorption peaks, and most preferred, the spectrum does not exhibit any of the aforementioned absorption peaks.

The maximum deviation may also be measured in terms of a root mean square (hereinafter RMS). One method to calculate the RMS is in accordance with the following equation:

$$\text{RMS} = \left( (1/n) \sum_{\lambda 1}^{\lambda n} (attn_i)^2 \right)^{1/2}$$

whrein "n" is the number of intervals in the given wavelength range, "λn" is the upper limit for the wavelength, "λ1" is the lower limit for the wavelength, and "$attn_i$" is the attenuation exhibited by the fiber at any given wavelength "i" between "n" and "1". For example in the case of the 1583 absorption peak, the range of wavelengths may include about 1565 nm to about 1595 nm. It is preferred that the RMS is not more than about 0.0090, preferably not more than about 0.0088, and most preferably not more than about 0.0086.

The aforementioned methods made may be incorporated into a process for manufacturing an optical fiber. For example the above methods may be incorporated into the processes for manufacturing a large effective area optical fiber or a dispersion managed optical fiber. Preferably, the dispersion managed fiber has at least one region which includes a refractive index decreasing dopant and the maximum Δ% of the region comprises about −0.35% or less, more preferably about −0.38% or less, even more preferably about −0.40% or less, and most preferably about −0.42% or less. For further description regarding a dispersion managed optical fiber the following U.S. patent application are incorporated herein by reference 60/208342 filed on May 31, 2000, 60/217967, filed on May 31, 2000, and 60/193080 filed on Mar. 30, 2000.

Treating at Temperatures of no more than about 1000° C.

The method includes heating preform 12, suspended in a furnace 30, to a temperature of less than about 1000° C. Preferably, soot preform 12 is heated to a temperature of less than about 800° C., more preferably about 25° C. to about 600° C., most preferably no more than about 400° C.

As shown in FIG. 1, furnace 30 is charged with a reducing agent. The reducing agent flows into contact with preform 12 in the direction of arrows 32. Preferably the reducing agent is a compound that will react with an oxide having the formula $M_xO_y$, wherein "M" is at least one element selected from following group of elements of the periodic chart with atomic numbers consisting of 21–30, 39–47, 57–79, 89–107, and mixtures thereof, "O" is oxygen, and "x" and "y" are integers greater than 0. More preferably, M is at least one element selected from the group of elements consisting of Zr, Ni, Fe, Ti, V, Cr, Mn, Co, Cu, Zn, and mixtures thereof.

A preferred reducing agent is carbon monoxide. It is more preferred that the reducing agent reacts with the $M_xO_y$ compound to form at least one carbonyl complex (—CO) containing reaction product. For example, if preform 12 includes a nickel oxide, the nickel oxide will react with the carbon monoxide reducing agent to form $Ni(CO)_4$. Most preferably, the carbonyl complex reaction product will volatilize at temperatures of less than about 200° C. at atmospheric conditions. An alternate reducing agent is $SO_2$. In addition to the reducing agent, preferably an inert gas such as helium, nitrogen, argon, or mixtures thereof is simultaneously charged into furnace 30 with the reducing agent. The invention is not limited to only the listed inert gases. Preferably, preform 12 is exposed to the reducing agent for a period of about one (1) to about four (4) hours.

Preferably, soot preform 12 is a silicate body with at least one component selected from the group consisting of alkali metal oxides, alkaline earth oxides, aluminum oxide, antimony oxide, and mixtures thereof. More preferably, preform 12 includes oxides having at least one element from the group of elements consisting of Sb, Al, B, Ga, In, Ti, Ge, Sn, Pb, P, As, Bi, Te, Se, and mixtures thereof. Optionally preform 12 may be formed from powdered batch materials for glass melting. Examples of suitable powdered batch materials include silica, alumina, alkali-oxides, and at least the other oxides mentioned above.

Optionally after preform 12 is exposed to the reducing agent, preform 12 is fluorine doped. The fluorine doping is accomplished by heating preform 12 to a doping temperature in the range from about 1000° C. to about 1600° C. Once preform 12 is heated to the appropriate doping temperature, preform 12 is exposed to a doping gas. Preferably, the doping gas includes at least one of the following fluorine containing gases selected from $CF_4$, $SiF_4$, $C_2F_6$, $SF_6$, $F_2$, $C_3F_8$, $NF_3$, $ClF_3$, chlorofluoro-carbons, and mixtures thereof. Preform 12 is exposed to the doping gas for a period of about 1 to about 6 hours.

Preform 12 is heated to a sintering temperature of about 1200° C. to about 1600° C. to sinter soot preform 12 into a glass. In the case of a fluorine doped preform, the preform may be sintered during or after fluorine doping. Preform 12 is maintained at the sintering temperature for a period of about one (1) to about six (6) hours, preferably about four (4) to about six (6) hours. During sintering, the preform may be exposed to an inert atmosphere. A preferred inert atmosphere may consist of He, Ar, $N_2$, or mixtures thereof. To form the tubular preform of FIGS. 4 and 5, the hole 18 was not closed as previously described.

Figure 4:
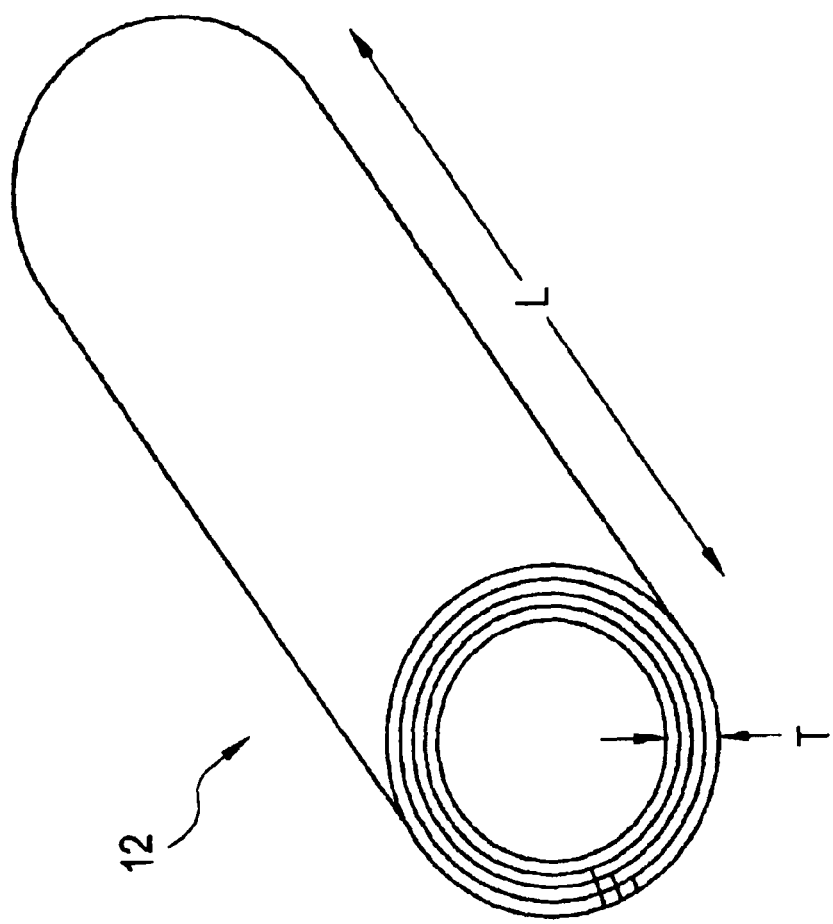
FIG. 4 is a perspective view of a tubular consolidated preform made in accordance with the invention.
Figure 5:
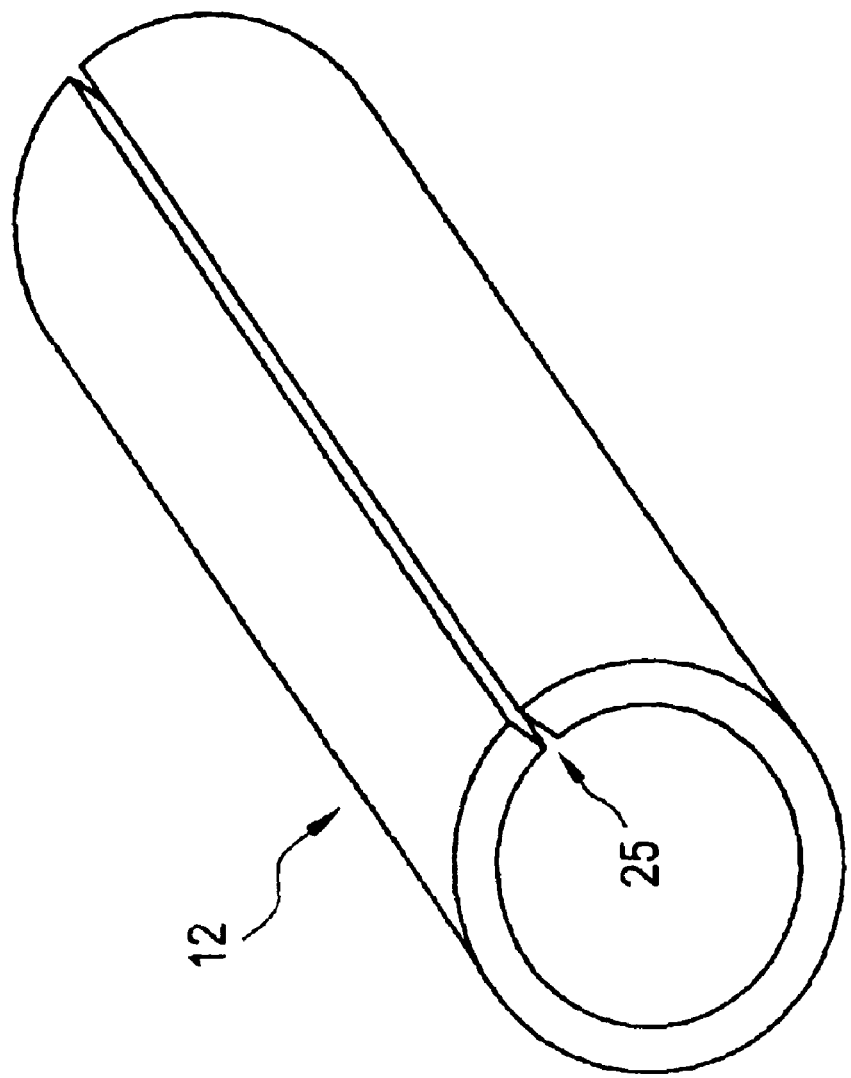
FIG. 5 is a perspective view of the tubular consolidated preform with a longitudinal slice made in accordance with the invention.

As shown in FIG. 4 and FIG. 5, sintered preform 12 has a longitudinal length L and cutting preform 12 includes cutting along this longitudinal length to form longitudinal cut 25. In a preferred embodiment, preform 12 is only cut once so that cut 25 results in only one piece of glass and provides a cross-sectional preform resembling a tightly closed "C" shape. Cut preform 12 is then flattened.

In an alternative embodiment, preform 12 is cut into at least two separate longitudinal pieces with at least two longitudinal cuts, preferably with the cuts equally spaced around the circumference of preform 12. Cutting preform 12 into more than one piece halves, thirds, and fourths is preferred when the inside circumference of preform 12 is two, three, or four times the width of the desired photomask. Cutting into fractions is a preferred method when the inside circumference of preform 12 is substantially larger than the width of the desired photomask blanks.

Figure 6:
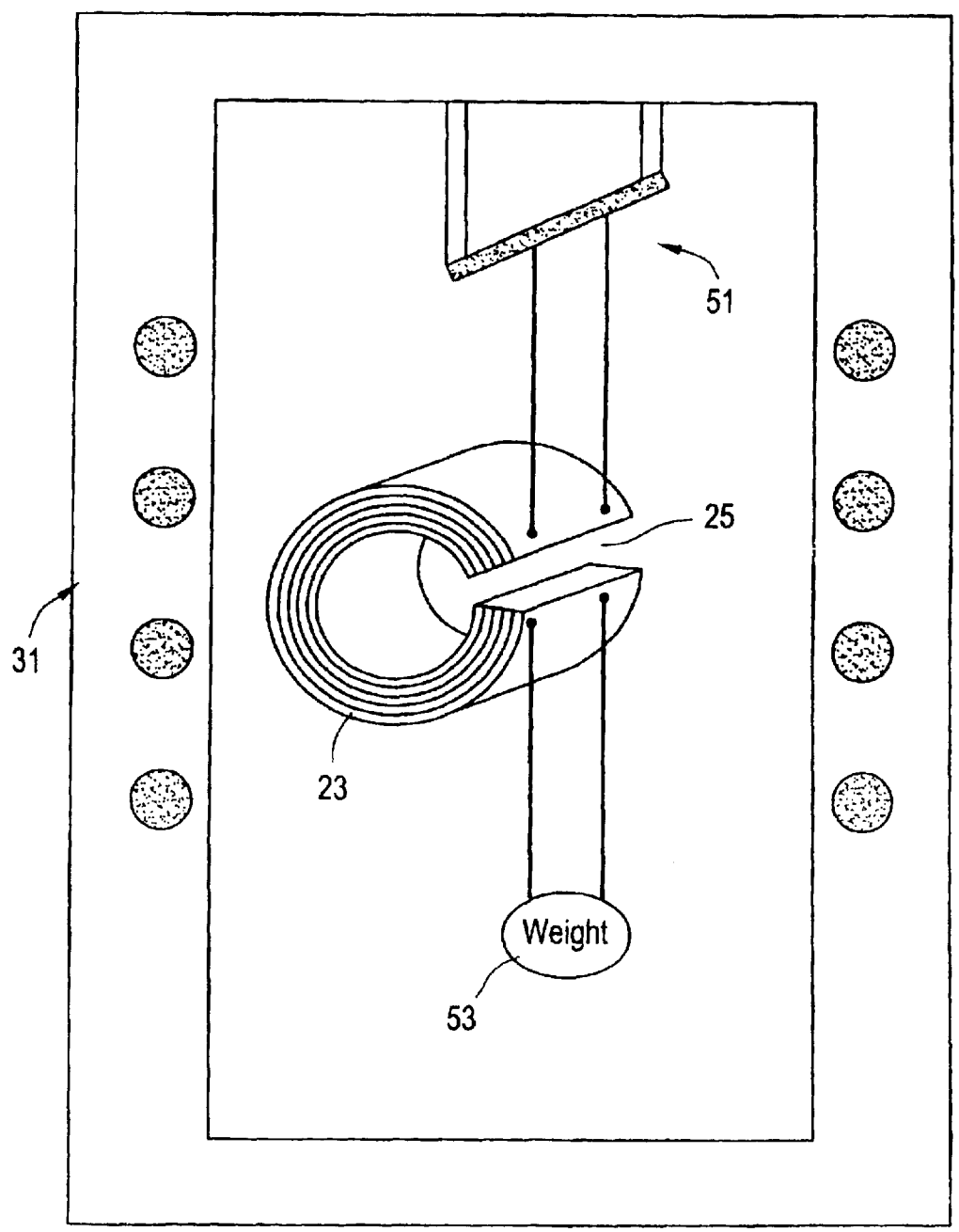
FIG. 6 is a perspective view of stretching a section of the tubular consolidated perform.
Figure 7:
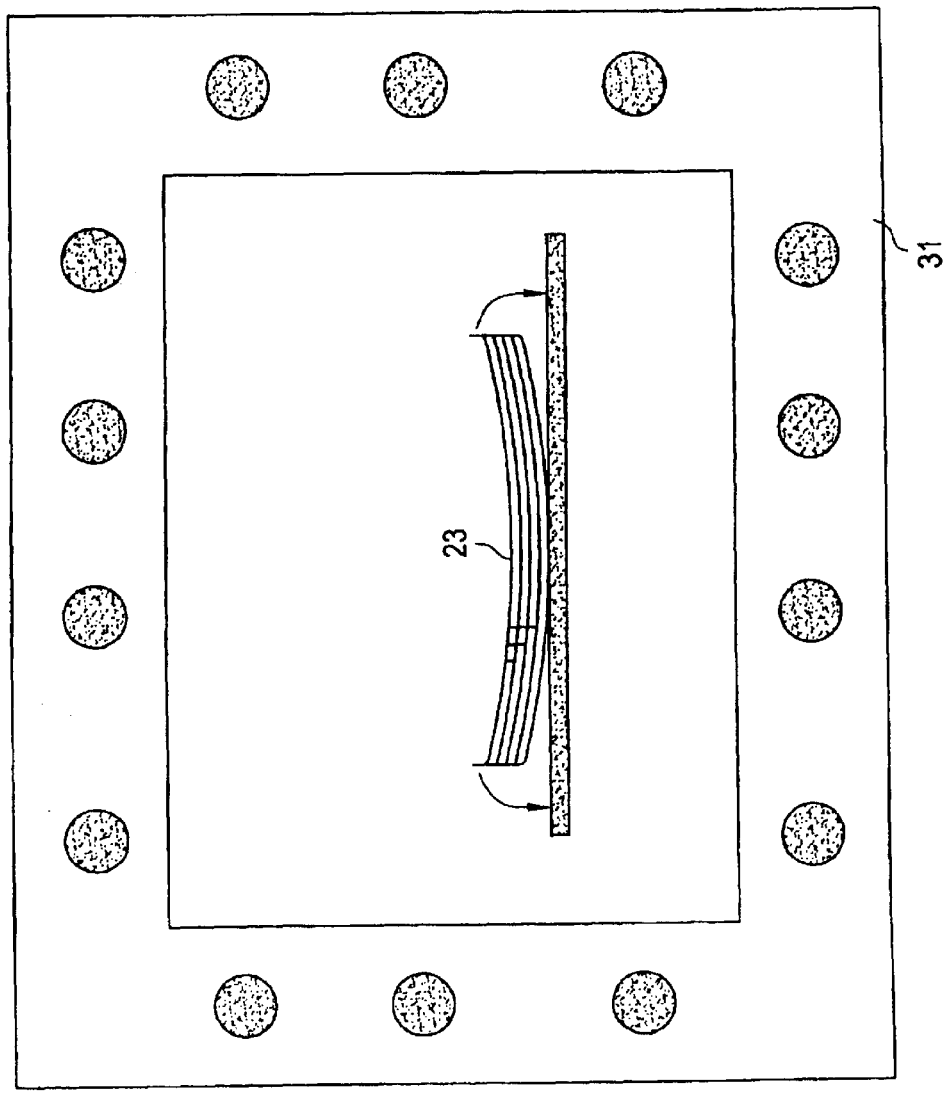
FIG. 7 is a side view of sagging the section of the consolidated preform.

As shown by FIG. 6, a C-shaped section 23 of preform 12 can be flattened into planar photomask blank member by hanging and stretching, followed by sagging, similar to flattening preform 12 with a single cut 25. Alternatively, the half preform can be directly sagged in a furnace. Similarly third sections of preform 12 and quarter sections of preform 12 can be directly sagged in a furnace 31. It is preferred that the preform fractions are positioned in the curved up position, for beneficial flattening.

It is preferred that the consolidated glass preform 12 is provided with the desired inside diameter and wall thickness prior to cutting and flattening. Such inside diameter and wall thickness is preferably provided by machining the tube such as by core-drilling.

Flattening the section 23 of consolidated preform 12 includes heating section 23 and applying a deforming force to heated section 23. As shown in FIG. 4, a preferred step of flattening section 23 includes hanging section 23 in a heated glass manipulation furnace 31 and applying a downward force on section 23, such as by attachment of a pulling weight. Hanging suspenders 51 provide a support for suspending section 23 from a position proximate the top of furnace 31. Hanging suspenders 51 preferably comprise platinum wire members attached to section 23 proximate cut 25. The platinum wires can be attached by drilling holes in section 23 and running the wires through the holes. Suspenders 51 and the platinum wires can be directly attached to the top of furnace 31 or indirectly attached to furnace 31.

Similarly the flattening downward force can be applied to section 23 by similar attachment of platinum wires and a hanging weight, preferably a silica hanging weight, to the opposite cut end of section 23 of preform 12. Force applying member 53 applies a flattening force to section 23 to assist in uncurling heated section 23. Preferably, furnace 31 is heated to at least about 1480° C., so that force applying member 53 produces an appropriately flattened section 23. The preferred temperature range for heating section 23 contained in furnace 31 for this uncurling flattening by hanging and stretching is in the range from about 1480 to about 1580° C. and is preferably less than about 1600° C., such as about 1500° C.

In addition to such hanging, further flattening of section 23 can be achieved by heating section 23 to a sagging temperature and applying a deforming force to heated section 23. As shown in FIG. 5, the uncurled cut section 23 resulting from the hanging process depicted in FIG. 4 can be further flattened by sagging in glass manipulation furnace 31. In the preferred step of sagging section 23 into a flattened cut section, furnace 31 is heated to a high enough temperature so that the weight of the elevated unsupported sections of cut section 23 is a sufficient deforming force to sag the cut tube into a flattened planar surface glass member.

Preferably furnace 31 is heated to a softening temperature high enough to sag cut section 23 and maintained at a temperature below the flowout temperature, so that section 23 is flattened while flowout and thinning of the glass is substantially inhibited. The sagging temperature is preferably in the range from about 1700 to about 1800° C., and more preferably about 1720 to about 1760° C., and most preferably about 1730° C. In addition to flattening by applying a deforming force to section 23 such as by hanging and/or sagging, a deforming force can be applied to the furnace heated section 23 by pressing.

In applying a pressing force to section 23, in addition to the section's own weight, a lower deforming temperature can be used. In applying a pressing force the tube can be treated to a temperature of about 1550 to about 1650° C. and a pressing force can be applied and distributed onto section 23 with a flat planar pressing member. Preferably the surfaces of section 23 which are pressed are covered with a platinum foil to isolate the glass preform. An alternative flat planar pressing member is a high purity dense graphite slab. High purity dense graphite members are also utilized as beneficial setters and furnace surfaces in the practice of the invention.

In addition to flattening section 23, heating of section 23 is preferably conducted in hydrogen free heated environments to insure that the glass is not contaminated with hydrogen and to allow any $H_2$ molecules entrapped in the glass to escape and outgas, to result in photomask blanks that have no detectable amount of hydrogen.

Heating section 23 comprises heating section 23 to the glass deforming softening point temperature wherein the viscosity of the glass is lowered so that the application of the deforming force deforms the glass tube.

For additional disclosure regarding the process of forming a consolidated preform into a photomask substrate the specifications of the following U.S. patent applications are incorporated herein by reference in their entirety: 60/119,805, filed Feb. 12, 1999, 60/123,861, filed Mar. 12, 1999, 60/135,270, filed May 21, 1999, 60/159,076, filed Oct. 12, 1999, 09/397,577, filed Sep. 16, 1999, 09/397,573, filed Sep. 16, 1999, and 09/397,572, filed Sep. 16, 1999.

The above method of the invention may be incorporated into the process of making a chlorine free photomask. A chlorine free photomask has the advantage of being able to transmit at least about 90% of light having a wavelength of about 157 nm, more preferably about 100% of light having a wavelength of about 157 nm.

EXAMPLES

The invention will be further clarified by the following examples which are intended to be exemplary of the invention.

Example 1

A preform assembly consisting of a quartz tube and a quartz boat, inside the tube, filled with silica sand Iota-6 (available from UNIMIN of New Canaan, Conn.) and γ-$Al_2O_3$ powder (available from Alfa Aesar of Ward Hill, Mass.) having an average particle size of less than ten (10) microns, was heated in a horizontal tube furnace for a period of about four (4) hours at a temperature of about 200° C. During the heating, the preform was exposed to a CO reducing agent. A continuous flow of about 1 liter per minute of CO gas was charged into the one end of the boat. The CO gas had a purity of about 99.7% and is available from BOC gases of Murray Hill, N.J.

The transition metal content of the γ-$Al_2O_3$ was tested before and after the CO treatment. The transition metal content was tested in accordance with Inductively Coupled Plasma Mass Spectrometry (ICP-MS) as preformed by Shiva Technologies of Syracuse, N.Y. The results of the testing are shown below in table 1—1.

TABLE 1-1

| Element | Concentration before CO treatment (ppm) | Concentration after CO treatment (ppm) |
|---|---|---|
| Ti | 10.0 | 1.0 |
| V | 1.4 | <0.05 |
| Cr | 1.5 | <1.0 |
| Mn | 1.6 | <0.05 |
| Fe | 60.0 | <2.0 |
| CO | 0.2 | <0.05 |
| Zn | 2.0 | 1.0 |

The CO treatment reduced concentration of each respective element by at least one-third.

Example 2

The effect of treating a preform, for making fiber, with a reducing agent was tested. Two preforms for manufacturing Submarine LEAF® fiber, available from Corning Incorporated of Corning, N.Y., were treated with CO during sintering for about four (4) hours after being treated in a chlorine containing atmosphere. The concentration of CO in the reducing atmosphere varied. One preform was treated in an atmosphere comprising about 300 ppm CO and the other preform was treated in an atmosphere comprising about 600 ppm CO. The performs were drawn into Submarine LEAF® fiber. Samples of fiber were drawn at two different draw speeds, as specified on FIG. 8, under either a low tension of about 90 g or a high tension of about 150 g. The attenuation exhibited by each fiber drawn at a certain draw speed was measured at a wavelength of about 1550 nm for a two (2) kilometer sample of each fiber. The two (2) km long lengths of fiber were heated to and maintained at a temperature of about 200° C. in an environmental chamber for about twenty (20) hours. The environmental chamber used was a Yamato DKN 600 (commercially available through VWR of West Chester, Pa.). The change in attenuation was measured. A control fiber was also tested. The control fiber differed from the test fibers in that the preform, from which the control fiber was drawn, was treated with $Cl_2$ and not treated with CO. The attenuation of each sample was measured on a PK-8 Spectral Attenuation Bench (commercially available from Photon Kinetics of Beavarton, Oreg.) in accordance with the operating procedures for the PK-8 Bench.

Figure 8:
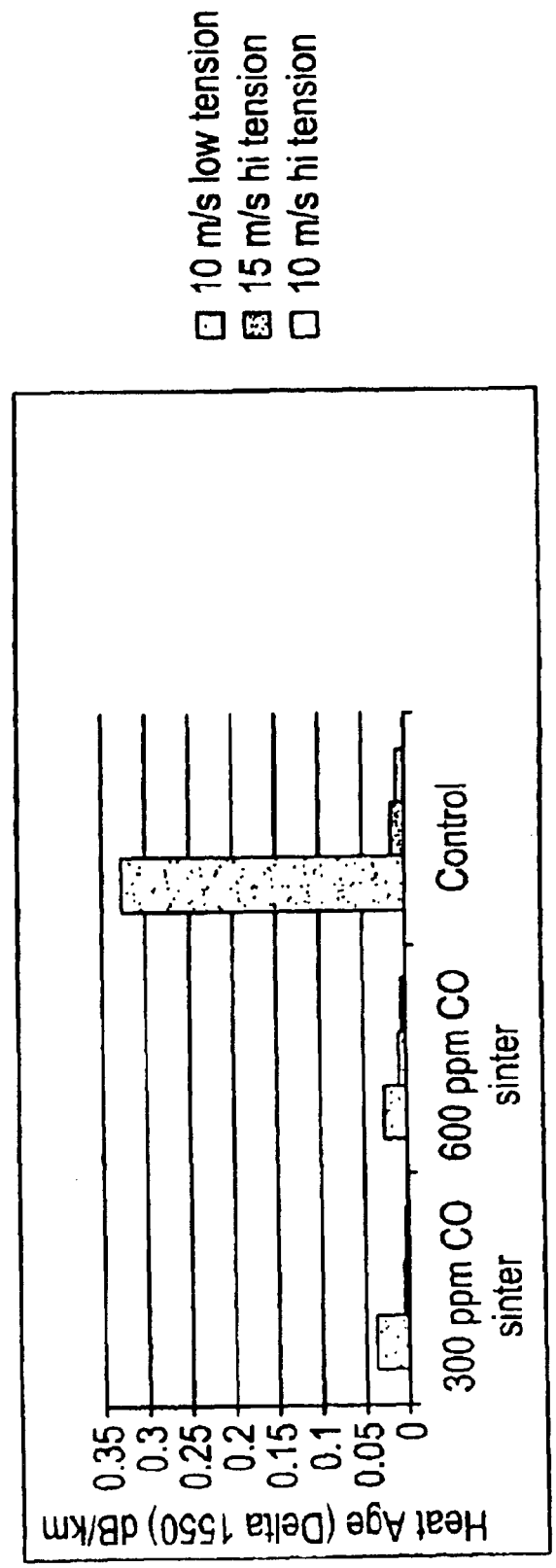
FIG. 8 is a bar graph of induced attenuation @ 1550 nm of fibers made in accordance with the invention and control fibers after the fibers have been exposed to 200° C. for 20 hours.

The results of the example are shown in FIG. 8. As shown in FIG. 8, the process of treating the fiber with a reducing agent reduces the induced attenuation. This is most evident for a fiber drawn at a rate of at least about ten (10) m/s and under a low tension. The fiber made in accordance with the invention exhibited a significant reduction in induced attenuation.

Example 3

The effect of treating fluorine doped preforms with the aforementioned reducing agent was tested. Three preforms were treated with a chlorine containing compound at a temperature of about 1000° C. The temperature in the furnace was then ramped up at a rate of 4° C./min to a temperature of about 1450° C. Each preform was treated in a fluorine containing atmosphere for about 1 hour as stated in table 3-1. As indicated in table 3-1 the fluorine doping atmosphere also included CO for the test fibers. The preform was drawn into a central core step index single mode fiber with an annular fluorine doped region. Samples of fiber were drawn at the same speed and tension. The attenuation for each two (2) kilometer long sample exhibited by each fiber was measured at a wavelength of about 1550 nm on a PK-2500 Spectral Attenuation Bench (commercially available from Photon Kinetics of Beavarton, Oreg.) in accordance with the operating procedures for the PK-2500 Bench. The fiber samples were maintained at a temperature of about 200° C. for about twenty (20) hours. The change in attenuation was measured. A control fiber was also tested in this manner. The control fiber differed from the test fibers in that the control fiber was dried with $Cl_2$ and then treated with $CF_4$ instead of the aforementioned inventive reducing agent and a fluorine containing compound.

TABLE 3-1

| Treating Environment | Induced Attenuation @ 1550 nm (dB/km) |
|---|---|
| 1% $CF_4$ (Control) with prior $Cl_2$ dry | 1.22 |
| 1% $CF_4$ + 1% CO with prior $GeCl_4$ dry | 0.00 |
| 1% $CF_4$ + 1% CO with prior $Cl_2$ dry | 0.05 |

The fiber manufactured using the disclosed reducing agents exhibited minimal to no increased attenuation. In comparison, the control fiber exhibited significant increase in attenuation.

Example 4

The effect of treating a preform with CO during sintering was further examined for improved resistance to a hydrogen environment. Two preforms were dried in an atmosphere of helium and up to about four percent (4%) by weight of $Cl_2$. The preforms were dried at a temperature of about 1000° C. to about 1150° C. for a period of about four (4) hours. One of the preforms was sintered in an atmosphere of at least about 200 ppm of CO and helium at a temperature of more than about 1100° C. to about 1600° C. The other preform was sintered in an inert atmosphere. The preforms were drawn into SMF-28™ optical fiber available from Corning, Incorporated.

A two kilometer sample of each fiber was exposed to an environment of one percent (1%) hydrogen at room temperature and atmospheric pressure for about 144 hours. The attenuation of the fiber was measured prior to the hydrogen exposure and the highest attenuation reached during the 144 hour exposure. The attenuation was measured on a Photon Kinetics PK-6 Attenuation Bench in accordance with FOTP 61.

Figure 9:
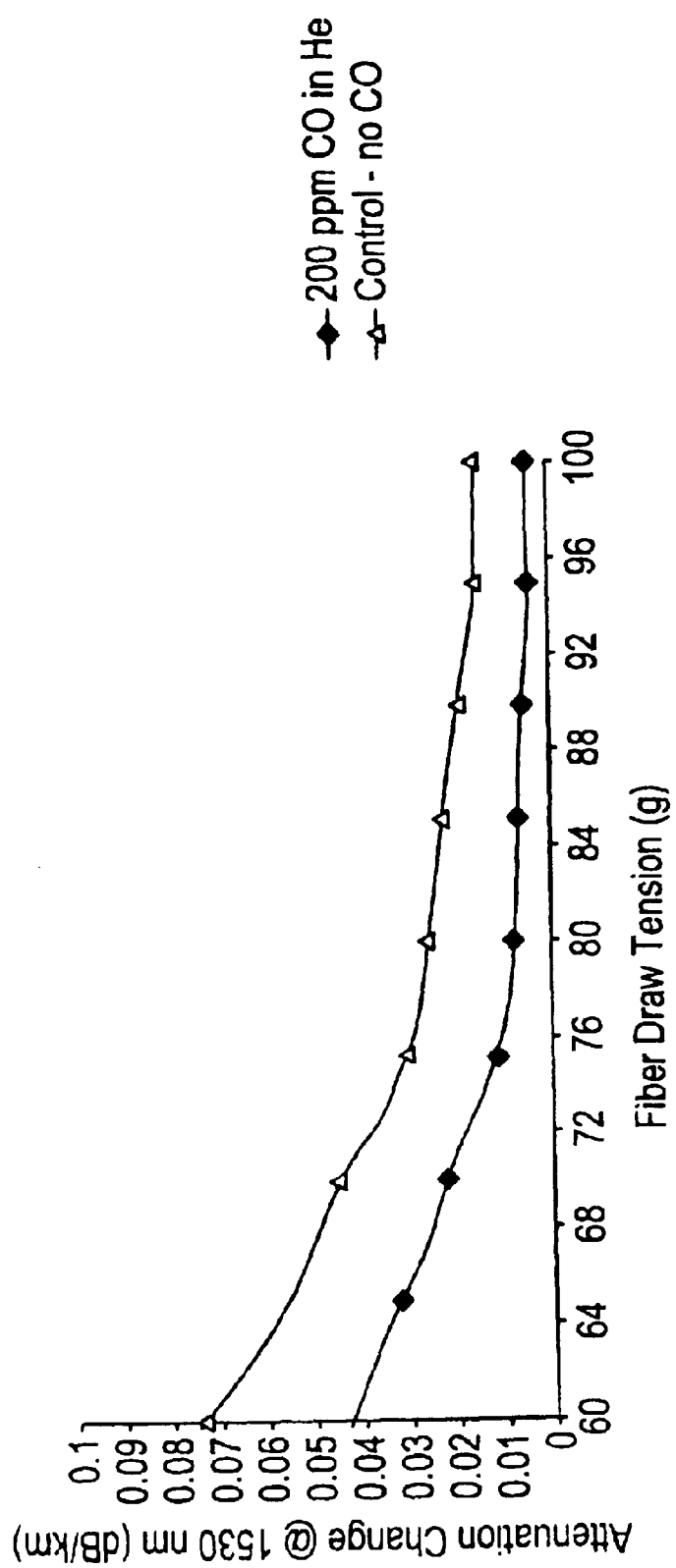
FIG. 9 is a graph of the hydrogen induced change in attenuation @ 1530 nm vs. the draw tension for a fiber made from a preform that was treated with CO after the preform was treated with a halide and for a control fiber that was made from a preform that was not treated with CO after the preform was treated with a halide.

The fiber drawn from the preform that was treated with CO after a halide drying step was less sensitive to hydrogen induced attenuation and exhibited a much lower change in attenuation at all fiber draw tensions than the control fiber, as shown in FIG. 9.

Example 5

The effect of treating fluorine doped preforms with the reducing agent was tested in this example. Each preform had a germanium doped central core region, a fluorine doped region adjacent the germanium central core, and a germanium ring separated from the central core by at least the fluorine doped region. The moat depression of the fluorine doped region is such that the preform may be drawn into a single mode fiber having a fluorine doped region with a delta percent of about −0.5% or less.

Prior to consolidation one preform was treated with carbon monoxide at a temperature of about 1000° C. A second preform was treated with an atmosphere of CO and $Cl_2$ at a temperature of about 1125° C. and a third preform was treated with an atmosphere of $Cl_2$. Each preform was drawn into a single mode fiber at a draw rate of at least about ten (10) m/s.

The attenuation exhibited by each fiber drawn at a certain draw speed was measured at a wavelength of about 1550 nm for a two (2) kilometer sample of each fiber. The 2 km long lengths of fiber were heated to and maintained at a temperature of about 200° C. in an environmental chamber for about twenty (20) hours. The environmental chamber used was a Yamato DKN 600 (commercially available through VWR of West Chester, Pa.). The change in attenuation was measured. A control fiber was also tested. The control fiber differed from the test fibers in that the preform, from which the control fiber was drawn, was treated with $Cl_2$ and not treated with CO. The attenuation of each sample was measured on a PK-8 Spectral Attenuation Bench (commercially available from Photon Kinetics of Beavarton, Oreg.) in accordance with the operating procedures for the PK-8 Bench.

Figure 10:
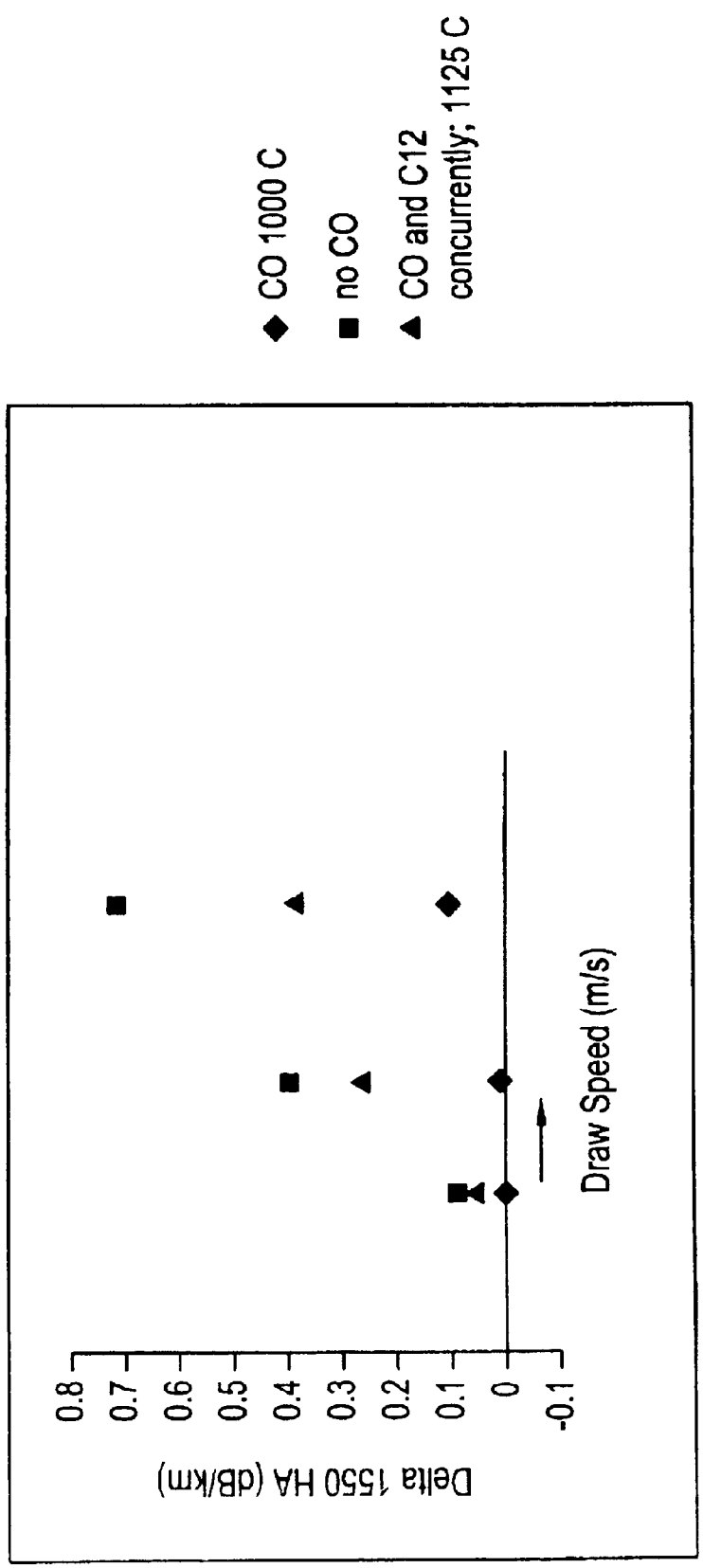
FIG. 10 is a graph of induced attenuation @ 1550 nm of fibers made in accordance with the invention and control fibers fibers after the fibers have been exposed to 200° C. for 20 hours.

The results of the example are shown in FIG. 10. As shown in figure, the process of treating the fiber with a reducing agent reduces the induced attenuation significantly. The fiber that was treated with chlorine only or concurrently with the reducing agent exhibited higher induced attenuation. This increased induced attenuation of fiber drawn from chlorine treated preforms was more noticeable as the draw speed of the fiber increased. The fiber made in accordance with the invention exhibited a significant reduction in induced attenuation.

Example 6

The effect of treating a preform, to be used to form a dispersion managed optical fiber such as Vascade™ fiber, available from Coning Incorporated of Corning, N.Y., with carbon monoxide to eliminate the aforementioned absorption peaks was tested. Four preforms were tested. All of the process steps in forming each preform were the same unless specified below. The control preform was not treated with carbon monoxide during any process steps. The process conditions for making the control preform are as follows:

1. the control preform was treated in an atmosphere of chlorine and helium for about ninety (90) minutes at a temperature of about 1150° C. and the flowrate of chlorine into the furnace was about 0.825 slpm and the flowrate of helium into the furnace was about 20 slpm.;
2. the control preform was exposed to an inert atmosphere of helium while the temperature in the furnace was increased from about 1150° C. to about 1225° C. and the time period of the ramp was about thirty (30) minutes;
3. the control preform was doped in atmosphere comprising 15% $CF_4$ and helium at a temperature of about 1225° C. for about 120 minutes and the flowrates of $CF_4$ and helium into the furnace were respectively 3 slpm ($CF_4$) and 17 slpm (helium); and
4. the control preform was sintered at about 1490° C. Additional soot was deposited onto the sintered preform. The soot coated preform was sintered and drawn into a fiber. The fiber was drawn under a tension of about 200 grams at a draw speed of about 9 meters per second.

In addition to the control preform, three (3) test preforms were formed. The test preforms differed with respect to what process steps included the use of carbon monoxide during the process of forming the preform. The concentration of carbon monoxide remained constant at 1200 ppm for each process step which included the use of carbon monoxide.

The use of carbon monoxide varied in that one (1) preform was formed with carbon monoxide present in the furnace during the ramp step and the doping step. With respect to a second preform, carbon monoxide was present in the furnace during the ramp step, the doping step, and sintering. As for the last test preform, carbon monoxide was present during the ramp step, the dope step, and a post doping outgassing step. The constant conditions for the drying, ramping, and doping steps of each one of the test preforms were as follows:

1. the test preforms were treated in an atmosphere of chlorine and helium for about ninety (90) minutes at a temperature of about 1150° C. and the flowrate of chlorine into the furnace was about 1 slpm and the flowrate of helium into the furnace was about 40 slpm.;
2. the test preforms were exposed to an inert atmosphere of helium and carbon dioxide while the temperature in the furnace was increased from about 1150° C. to about 1225° C. and the time period of the ramp was about thirty (30) minutes;
3. the test preforms were doped in atmosphere comprising 15% $CF_4$ and helium at a temperature of about 1225° C. for about 90 minutes and the flowrates of $CF_4$ and helium into the furnace were respectively 3 slpm ($CF_4$) and 17 slpm (helium); and
4. the test preforms were sintered at about 1490° C. Additional soot was deposited onto each sintered preform. The soot coated preforms were sintered and drawn into a fiber. The fiber was drawn under a tension of about 200 grams at a draw speed of about 9 meters per second.

Figure 13:
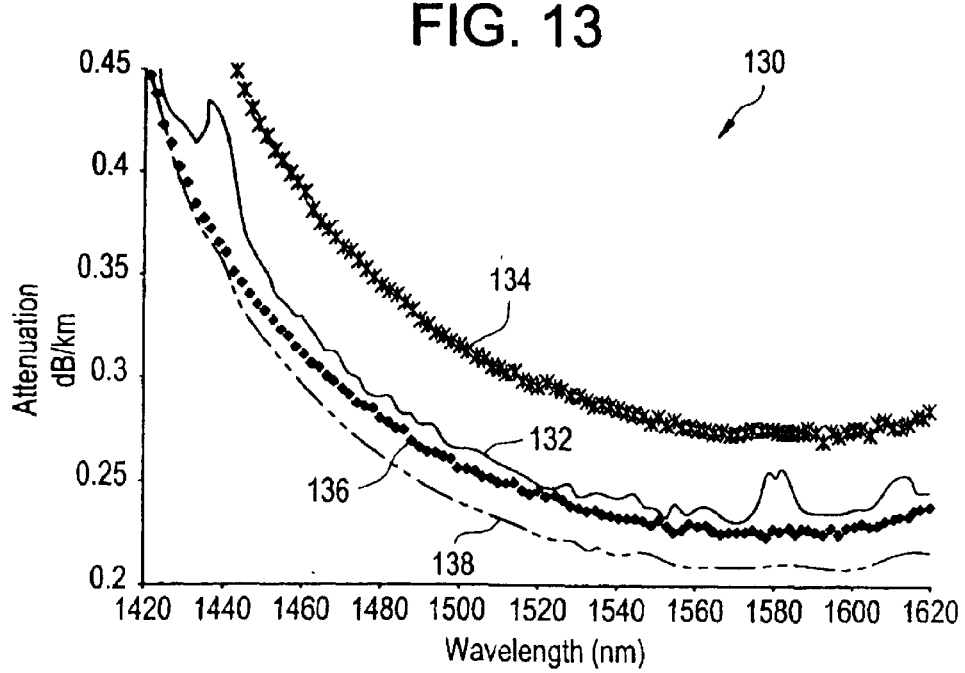
FIG. 13 is a graph of a spectrum of attenuation versus wavelength of three (3) preforms made in accordance of at least one method of the invention and a control prefrom.

Each one of the four (4) preforms was drawn into an optical fiber. An attenuation spectrum, over a range of wavelengths from about 1420 nm to about 1620 nm, of each fiber was determined and is illustrated in FIG. 13, generally designated 130. The fiber was tested on a Photon Kinetics (hereinafter "PK") bench attenuation measurement device. A suitable device is Model 2500, optical fiber analysis system, from GN Nettest of Hopkinton, Mass. The user's manual for the model is incorporated herein by reference. The use of Model 2500 to perform the attenuation measurement is explained therein. A step size of 1 nm was used in the example. The length of each sample of fiber that was tested was about two (2) km and each sample was arranged in a loose coil.

As depicted in FIG. 13, the control fiber exhibited at the aforementioned absorption peaks of about 1440 nm, about 1543 nm, about 1580 nm, and about 1610 nm as described above, see line 132. Each absorption peak exhibited by the control fiber was greater than 0.012 dB/km. Each one of the test preforms did not exhibit any of the aforementioned absorption peaks to a measurable extent, see lines 134, 136, and 138.

It will be apparent to those skilled in the art that various modifications and variations can be made to the present invention without departing from the spirit and scope of the invention. Thus, it is intended that the present invention include the modifications and variations of this invention provided they come within the scope of the appended claims and their equivalents.

What is claimed is:

1. A method of making an optical fiber preform comprising:

exposing a soot body to a substantiaily halide free atmosphere containing carbon monoxide doping the soot body in an atmosphere comprising carbon monoxide and at least one fluorine containing compound having the general formula $C_nF_{2n+2}$, wherein "n" is a positive whole number.

2. The method according to claim 1 wherein said exposing atmosphere further comprises an inert material and a ratio of the concentration of carbon monoxide to the concentration of inert material comprises more than about 0.0012.

3. The method according to claim 2 wherein said ratio comprises no more than about 0.48.

4. The method according to claim 1 wherein a concentration of carbon monoxide in the atmosphere during said exposing step comprises at least 300 ppm.

5. The method according to claim 1 wherein a concentration of carbon monoxide in the atmosphere during said exposing step comprises up to about 4800 ppm.

6. The method according to claim 1 further comprising sintering the soot body in an atmosphere comprising carbon monoxide.

7. The method according to claim 6 further comprising drawing the preform into an optical fiber, wherein the fiber exhibits an attenuation spectrum in which the attenuation exhibited by the fiber does not deviate by more than about 0.012 dB/km over a range of wavelengths between about 1565 nm to about 1595 nm.

8. The method according to claim 7 wherein the range of wavelengths comprises between about 1570 nm to about 1590 nm.

9. The method according to claim 7 wherein the deviation in attenuation comprises no more than about 0.06 dB/km.

10. The method according to claim 7 wherein the fiber exhibits an attenuation spectrum in which the attenuation exhibited by the fiber does not deviate by more than about 0.012 dB/km over at least one additional range of wavelengths selected from the ranges of wavelengths between about 1400 nm to about 1470 nm, about 1536 nm to about 1556 nm, and about 1600 nm to about 1620 nm.

11. The method according to claim 10 wherein the deviation in attenuation comprises no more than about 0.06 dB/km.

12. The method according to claim 1 further comprising drawing the preform into an optical fiber, wherein the fiber exhibits an attenuation spectrum that has a root mean square of about 0.009 or less over a range of wavelengths between about 1565 nm to about 1595 nm.

13. The method according to claim 12 wherein said root mean square comprises less than about 0.0088.

14. The method according to claim 12 wherein the fiber exhibits an attenuation spectrum in which the attenuation exhibited by the fiber that has a root mean square of about 0.009 or less at least one range of wavelengths selected from a group of ranges of wavelengths between about 1400 nm to about 1470 nm, about 1536 nm to about 1556 nm, and about 1600 nm to about 1620 nm.

* * * * *